US010977010B2

(12) United States Patent
Sharma et al.

(10) Patent No.: US 10,977,010 B2
(45) Date of Patent: *Apr. 13, 2021

(54) DEVELOPMENT ENVIRONMENT FOR REAL-TIME DATAFLOW PROGRAMMING LANGUAGE

(71) Applicant: FogHorn Systems, Inc., Sunnyvale, CA (US)

(72) Inventors: Abhishek Sharma, Mountain View, CA (US); Jason Lucas, Renton, WA (US)

(73) Assignee: FogHorn Systems, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/854,873

(22) Filed: Apr. 21, 2020

(65) Prior Publication Data

US 2020/0249920 A1 Aug. 6, 2020

Related U.S. Application Data

(63) Continuation of application No. 16/190,105, filed on Nov. 13, 2018, now Pat. No. 10,628,135, which is a (Continued)

(51) Int. Cl.
*G06F 8/35* (2018.01)
*G06F 8/34* (2018.01)
(Continued)

(52) U.S. Cl.
CPC .............. *G06F 8/35* (2013.01); *G06F 8/31* (2013.01); *G06F 8/34* (2013.01); *G06F 8/40* (2013.01);
(Continued)

(58) Field of Classification Search
None
See application file for complete search history.

(56) References Cited

U.S. PATENT DOCUMENTS 4,975,865 A 12/1990 Carrette et al.
6,725,287 B1 4/2004 Loeb et al.
(Continued)

FOREIGN PATENT DOCUMENTS

CN 101860978 10/2010
CN 103024059 4/2013
CN 103200249 7/2013

OTHER PUBLICATIONS

Privat et al. Edge-of-Cloud Fast-Data Consolidation for the Internet of Things, 19th International ICIN Conference—Innovations in Clouds, Internet and Networks—Mar. 1-3, 2016, pp. 226-233. (Source: http://dl.ifip.org/db/conf/icin/icin2016/1570229504.pdf).

(Continued)

*Primary Examiner* — Philip Wang
(74) *Attorney, Agent, or Firm* — Aka Chan LLP

(57) ABSTRACT

A dataflow programming language can be used to express reactive dataflow programs that can be used in pattern-driven real-time data analysis. One or more tools are provided for the dataflow programming language for checking syntactic and semantic correctness, checking logical correctness, debugging, translation of source code into a secure, portable format (e.g., packaged code), translation of source code (or packaged code) into platform-specific code, batch-mode interpretation, interactive interpretation, simulation and visualization of the dataflow environment, remote execution, monitoring, or any combination of these. These tools embody a method of developing, debugging, and deploying a dataflow graph device.

20 Claims, 20 Drawing Sheets

Related U.S. Application Data continuation of application No. 15/467,318, filed on Mar. 23, 2017, now Pat. No. 10,127,022.

(60) Provisional application No. 62/312,106, filed on Mar. 23, 2016, provisional application No. 62/312,187, filed on Mar. 23, 2016, provisional application No. 62/312,223, filed on Mar. 23, 2016, provisional application No. 62/312,255, filed on Mar. 23, 2016.

(51) Int. Cl.

| | | |
|---|---|---|
| *G06F 8/40* | (2018.01) | |
| *G06F 8/30* | (2018.01) | |
| *G06F 11/36* | (2006.01) | |
| *G06F 16/9535* | (2019.01) | |
| *G06F 9/448* | (2018.01) | |
| *G06F 9/48* | (2006.01) | |

(52) U.S. Cl.
CPC ............ *G06F 9/4498* (2018.02); *G06F 9/48* (2013.01); *G06F 11/3664* (2013.01); *G06F 11/3668* (2013.01); *G06F 16/9535* (2019.01)

(56) References Cited

U.S. PATENT DOCUMENTS

| | | | | |
|---|---|---|---|---|
| 7,864,178 | B2 * | 1/2011 | Marini | G06F 8/34 345/440 |
| 7,937,665 | B1 * | 5/2011 | Vazquez | G05B 19/0426 715/763 |
| 8,572,155 | B2 | 10/2013 | Yanovich et al. | |
| 9,843,647 | B2 | 12/2017 | Stenneth | |
| 2003/0034998 | A1 * | 2/2003 | Kodosky | H04L 67/36 715/736 |
| 2003/0035582 | A1 | 2/2003 | Linhart | |
| 2004/0002838 | A1 | 1/2004 | Oliver et al. | |
| 2004/0090471 | A1 * | 5/2004 | Cone | G06F 9/451 715/853 |
| 2005/0251789 | A1 * | 11/2005 | Peck | G06F 9/44505 717/113 |
| 2005/0257203 | A1 * | 11/2005 | Nattinger | G06F 11/323 717/154 |
| 2005/0268288 | A1 * | 12/2005 | Nattinger | G06F 8/34 717/125 |
| 2006/0094443 | A1 | 5/2006 | Dowling et al. | |
| 2007/0250299 | A1 | 10/2007 | Paxson et al. | |
| 2008/0134158 | A1 | 6/2008 | Salz et al. | |
| 2009/0055126 | A1 | 2/2009 | Yanovich et al. | |
| 2009/0106011 | A1 * | 4/2009 | Chen | G06F 8/10 703/17 |
| 2009/0179921 | A1 | 7/2009 | Raghavan et al. | |
| 2009/0228407 | A1 | 9/2009 | Ramesh et al. | |
| 2010/0293301 | A1 * | 11/2010 | Amini | G06F 9/544 710/12 |
| 2011/0004863 | A1 | 1/2011 | Feblowitz et al. | |
| 2013/0110745 | A1 * | 5/2013 | Zhang | G06N 5/025 706/12 |
| 2013/0144814 | A1 * | 6/2013 | Klinger | G06N 7/005 706/12 |
| 2014/0013313 | A1 * | 1/2014 | Eker | G06F 8/33 717/132 |
| 2014/0047107 | A1 | 2/2014 | Maturana et al. | |
| 2014/0359552 | A1 | 12/2014 | Misra et al. | |
| 2015/0067791 | A1 | 3/2015 | Matus | |
| 2015/0161214 | A1 * | 6/2015 | Kali | G06F 16/24558 707/758 |
| 2015/0244826 | A1 | 8/2015 | Stenneth | |
| 2015/0312125 | A1 | 10/2015 | Subramanian et al. | |
| 2015/0371465 | A1 | 12/2015 | Garrett et al. | |
| 2015/0381712 | A1 | 12/2015 | De Castro et al. | |
| 2016/0065306 | A1 | 3/2016 | Huang et al. | |
| 2016/0146617 | A1 | 5/2016 | Macfarlane | |
| 2016/0247089 | A1 | 8/2016 | Zhao et al. | |
| 2017/0011298 | A1 | 1/2017 | Pal et al. | |
| 2017/0277800 | A1 * | 9/2017 | Lucas | G06F 11/3668 |

OTHER PUBLICATIONS

International Search Report, PCT Application PCT/US2017/023912, dated Jul. 12, 2017, 3 pages.

Mohammad Aazam, Eui-Nam Huh, Fog Computing and Smart Gateway Based Communication for Cloud of Things, 2014 International Conference on Future Internet of Things and Cloud, Aug. 31, 2014, pp. 464-470, IEEE, https://pdfs.semanticscholar.org/aa8a/6894735dc32aa7212ab7606ccd6d6e7338b9.pdf.

Coral8, Inc., Complex Event Processing: Ten Design Patterns, Coral8, Inc. Make It Continuous, 2006, 23 pages, website: https://complexevents.com/wp-content/uploads/2007/04/Coral8DesignPatterns.pdf, Coral8, Inc., Mountain View, California, United States.

European Patent Office, Extended European Search Report, EP Application No. 17771201.5, dated Oct. 22, 2019, 10 pages.

\* cited by examiner

```
○ ○ ○                                                                                              1. out:demo (ssh)
× | vm:src (ssh)      ⌘1 | ×  | out:demo (ssh)   ⌘2 | ×ubuntu@ip-172-31-2...  ⌘3 | ×ubuntu@ip-172-31-1...  ⌘4 | ×ubuntu@ip-172-31-1...  ⌘5
abhi@abhi-VirtualBox:~/foghorn-edgestack/out/release/foghorn/vel$ ./vel show_manifest test.vel
pub: valve_opened (bool)                                              verifies correctness and also logically detects data flow.
sub: valve_status ({ is_open is bool, timestamp is int })             pub: indicates data flowing out (output)
                                                                      sub: indicates data flowing in (input)
abhi@abhi-VirtualBox:~/foghorn-edgestack/out/release/foghorn/vel$ ▌
```

FIG. 14

```
abhi@abhi-VirtualBox:~/foghorn-edgestack/out/release/foghorn/vel$ ./vel debug
vel>
vel>
```

FIG. 15

```
vel> load valve_test "test.vel"
vel>
vel> ▌
```

FIG. 16

```
vel> status
* valve_test: unstarted
1 loaded packages(s)
vel>
vel>
vel> manifest
* valve_test
    pub    valve_opened (bool)
    sub    valve_status ({is_open is bool, timestamp is int})
vel>
vel>
vel> ■
```

FIG. 17

```
vel> inject valve_test. valve_status = {is_open is false, timestamp is 1523723362}
vel>
vel> ■
```

FIG. 18

```
vel> deadline
* valve_test: never
next: never
vel> ∎
```

FIG. 19

```
vel> inject valve_test.valve_status = {is_open is true, timestamp is 152372362}
vel> ∎
```

FIG. 20

```
vel> go
<0(ms) elapsed>
valve_test.valve_opened --> true
vel> ∎
```

FIG. 21

```
abhi@abhi-VirtualBox:~/foghorn-edgestack/out/release/foghorn/vel$ ./vel dump_graph --help
usage: vel dump_graph [OPTIONS] package
 <package>         The name of the package whose graph is to be dumped. (string; required)
 --port <port number>  The port on which to contact the manager. (uint16; optional, default: 8577)
 --host <name>     The DNS-resolvable name of the host on which the manager is running. This is
                   (string; optional, default: localhost)
 --struct          The dump will include the structure of the graph.
 --state           The dump will include the structure of the graph.
 --?               show usage
 --help            show help
 --version         show version
abhi@abhi-VirtualBox:~/foghorn-edgestack/out/release/foghorn/vel$ ▮
```
— 2205

*FIG. 22A* required when connecting to a non-local manager and is otherwise optional. — 2207

*FIG. 22B*

DEVELOPMENT ENVIRONMENT FOR REAL-TIME DATAFLOW PROGRAMMING LANGUAGE

CROSS-REFERENCE TO RELATED APPLICATIONS

This patent application is a continuation of U.S. patent application Ser. No. 16/190,105, filed Nov. 13, 2018, issued as U.S. Pat. No. 10,628,135 on Apr. 21, 2020, which is a continuation of U.S. patent application Ser. No. 15/467,318, filed Mar. 23, 2017, issued as U.S. Pat. No. 10,127,022 on Nov. 13, 2018, which claims the benefit of U.S. patent applications 62/312,106, 62/312,187, 62/312,223, and 62/312,255, filed Mar. 23, 2016. These applications are incorporated by reference along with all other references cited in this application.

BACKGROUND OF THE INVENTION

The invention relates to the field of computing, and more specifically a development environment with tools for a dataflow program programming language, especially for use in edge computing to handle the large amounts of data generated by industrial machines.

Traditional enterprise software application hosting has relied on datacenter or "cloud" infrastructure to exploit economies of scale and system efficiencies. However, these datacenters can be arbitrarily distant from the points of physical operations (e.g., factories, warehouses, retail stores, and others), where the enterprise conducts most of its business operations. The industrial Internet of things (IIoT) refers to a collection of devices or use-cases that relies on instrumentation of the physical operations with sensors that track events with very high frequency.

Industrial machines in many sectors com under this Internet of things (IoT) including manufacturing, oil and gas, mining, transportation, power and water, renewable energy, health care, retail, smart buildings, smart cities, and connected vehicles. Despite the success of cloud computing, there are number of shortcomings: It is not practical to send all of that data to cloud storage because connectivity may not always be there, bandwidth is not enough, variation in latencies is too high, or it is cost prohibitive even if bandwidth exists. Even if connectivity, bandwidth, and cost are not issues, there is no real-time decision making and predictive maintenance that can result in significant damage to the machines.

Therefore, improved development environment with tools for a dataflow program programming language are needed, especially for use in edge computing to handle the large amounts of data generated by industrial machines.

BRIEF SUMMARY OF THE INVENTION

A dataflow programming language can be used to express reactive dataflow programs that can be used in pattern-driven real-time data analysis. One or more tools are provided for the dataflow programming language for checking syntactic and semantic correctness, checking logical correctness, debugging, translation of source code into a secure, portable format (e.g., packaged code), translation of source code (or packaged code) into platform-specific code, batch-mode interpretation, interactive interpretation, simulation and visualization of the dataflow environment, remote execution, monitoring, or any combination of these. These tools embody a method of developing, debugging, and deploying a dataflow graph device.

In a specific implementation, tools for a dataflow program programming language are used in an edge computing system. A method enables intelligence at the edge. Features include: triggering by sensor data in a software layer hosted on either a gateway device or an embedded system. Software layer is connected to a local-area network. A repository of services, applications, and data processing engines is made accessible by the software layer. Matching the sensor data with semantic descriptions of occurrence of specific conditions through an expression language made available by the software layer. Automatic discovery of pattern events by continuously executing expressions. Intelligently composing services and applications across the gateway device and embedded systems across the network managed by the software layer for chaining applications and analytics expressions. Optimizing the layout of the applications and analytics based on resource availability. Monitoring the health of the software layer. Storing of raw sensor data or results of expressions in a local time-series database or cloud storage. Services and components can be containerized to ensure smooth running in any gateway environment.

Edge intelligence is enabled at the source of the Internet of things (IoT) data. A system provides enriched access (stream or batch modes, or both) to IoT device sensor data for real-time edge analytics and applications. The system includes a highly efficient and expressive computer language for executing analytical functions and expressions, through a high performance analytics engine that operates in low memory footprint machines. The system allows publishing of aggregate data to cloud to further machine learning. The system includes a software development kit for developing edge apps. A cloud-based management console allows managing of edge deployments, configuration, applications, and analytics expressions.

A specific implementation of an edge infrastructure and platform is by FogHorn Systems, Inc. (FogHorn). The FogHorn Web site, www.foghorn-systems.com, publications (including white papers, user guides, tutorials, videos, and others), and other publications about FogHorn technology and products are incorporated by reference.

FogHorn provides a platform to enable edge intelligence for industrial and commercial internet of things (IoT) data. The amount of data generated by tens of billions of industrial and commercial IoT devices will be massive enough to overwhelm the entire Internet. The FogHorn platform processes, analyzes, and responds to IoT data right where it originates—at the edge of the network. FogHorn's "intelligent edge" software platform enables unprecedented levels of automation, operational efficiency, cost savings, and much more.

The Industrial Internet of Things (IIoT) consists of interconnected industrial and commercial devices such as sensors, machinery, and computers. The goal of IIoT is to enable greater device control, data management, machine automation, and operational efficiency across a distributed enterprise. Companies can apply fog computing at the edge to capture greenfield IIoT opportunities using real-time analytics and automated responses while also leveraging cloud computing for system-wide management and optimization. FogHorn edge computing platform is also designed to run in existing programmable logic controllers (PLCs) (e.g., Brownfield opportunities) if adding additional computing resources is not viable. Brownfield refers to an implementation of new systems to resolve information technology (IT) problem areas while accounting for established systems. New software architecture takes into account existing and running software.

Edge intelligence platform is a software-based solution based on fog computing concepts which extends data processing and analytics closer to the edge where the IIoT devices reside. Maintaining close proximity to the edge devices rather than sending all data to a distant centralized cloud, minimizes latency allowing for maximum performance, faster response times, and more effective maintenance and operational strategies. It also significantly reduces overall bandwidth requirements and the cost of managing widely distributed networks.

Focusing on IIoT operations at the edge reduces overall bandwidth requirements and enables immediate automated responses to time-sensitive conditions. The industrial world is adding billions of new IIoT devices and collectively these devices generate many petabytes of data each day. Sending all of this data to the cloud is not only very cost prohibitive but it also creates a greater security risk. Operating at the edge ensures much faster response times, reduced risks, and lower overall costs.

U.S. patent application 62/210,981, filed Aug. 27, 2015, and Ser. No. 15/250,720, filed Aug. 29, 2016, are incorporated by reference and describe an edge computing environment and platform. U.S. patent application Ser. No. 15/467,306, filed Mar. 23, 2017, is incorporated by reference and describes efficient state machines for real-time dataflow programming. U.S. patent application Ser. No. 15/467,313, filed Mar. 23, 2017, is incorporated by reference and describes a composition of pattern-driven reactions in real-time dataflow programming.

In an implementation, a development environment for a dataflow programming language allows specifying of at least one matcher state machine that can perform pattern matching in a received an input stream and generate output data. The development environment includes tools for: identifying potential data streams; identifying a set of reactive functions and parameters corresponding to patterns of data in the streams; identifying a set of handling functions and parameters for transforming data matching declared patterns; or identifying a set of timed events against which patterns of data flow are compared, or any combination of these.

In another implementation, a system for dataflow programming development platform includes a graphical user interface that is displayed on a screen of a computer. There is a declarations screen where the user can specify declarations data types. Blocks representing the declarations data types are displayed on the screen so that the user can drag and drop the blocks into a desired position on the screen. There is a reactions screen where the user can interconnect the blocks of the declarations data types into a graphical representation of a dataflow program. There is a compute block screen where the user can view and specify an operation performed by a compute block. There is a code view screen where the user can view and edit a computer code representation automatically generated by the development platform to implement the dataflow program. The user can request the development platform interface to compile a dataflow program package representation of the dataflow program the user had specified.

In another implementation, a method of developing a dataflow program includes: Using a graphical user interface to specify a graphical representation of a dataflow program. The user can select and move producer types, transducer types, and extractor types, represented using blocks, into various positions on a computer screen. The user can interconnect via interconnection links the blocks. The user can specify the details of each of the blocks. A development platform automatically generates computer source code that corresponds to the dataflow program the user specified graphically. The user can view and edit the computer source code automatically generated in a textual or editor interface. The user to can direct the platform to generating computer package code for the dataflow program that will be executable on a target hardware platform.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 14 shows a screen of verifying and testing logical correctness.

FIG. 15 shows a screen of a command debugger.

FIG. 16 shows a screen of a load directive.

FIG. 17 shows a screen of a status and manifest directive.

FIG. 18 shows a screen of a valve currently not open.

FIG. 19 shows a screen of a deadline directive.

FIG. 20 shows a screen of a valve to be open.

FIG. 21 shows a screen of a go directive.

FIGS. 22A-22B show a state and shape of data flow.

DETAILED DESCRIPTION OF THE INVENTION

Figure 1:
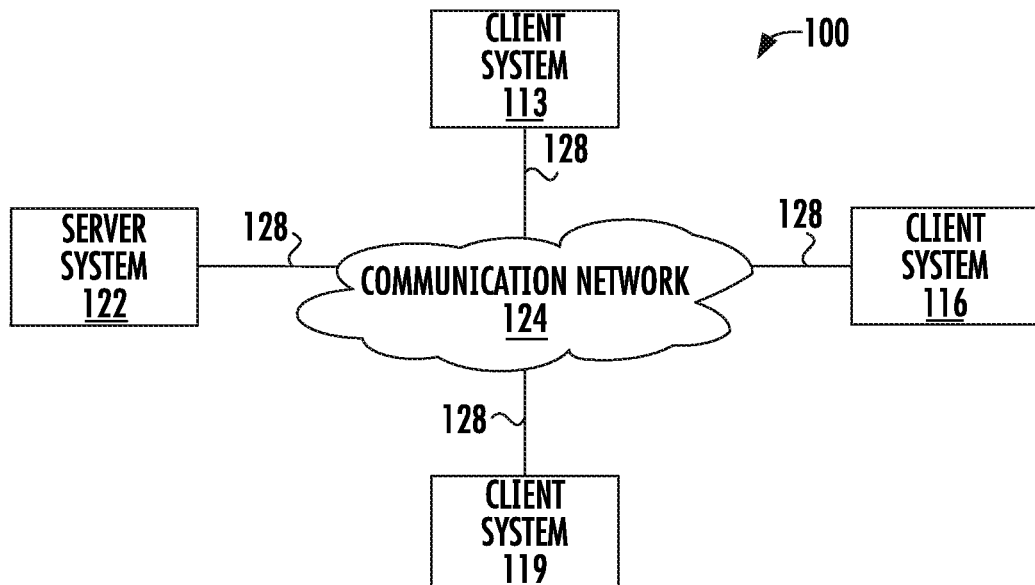
FIG. 1 shows a block diagram of a client-server system and network.

FIG. 1 is a simplified block diagram of a distributed computer network 100 incorporating an embodiment of the present invention. Computer network 100 includes a number of client systems 113, 116, and 119, and a server system 122 coupled to a communication network 124 via a plurality of communication links 128. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Communication links 128 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 1. These communication protocols may include VLAN, MPLS, TCP/IP, Tunneling, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment incorporating the present invention and does not limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a stand-alone computer system.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, the client systems can run as a stand-alone application such as a desktop application or mobile smartphone or tablet application. In another embodiment, a "web browser" application executing on a client system enables users to select, access, retrieve, or query information stored by server system 122. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 2:
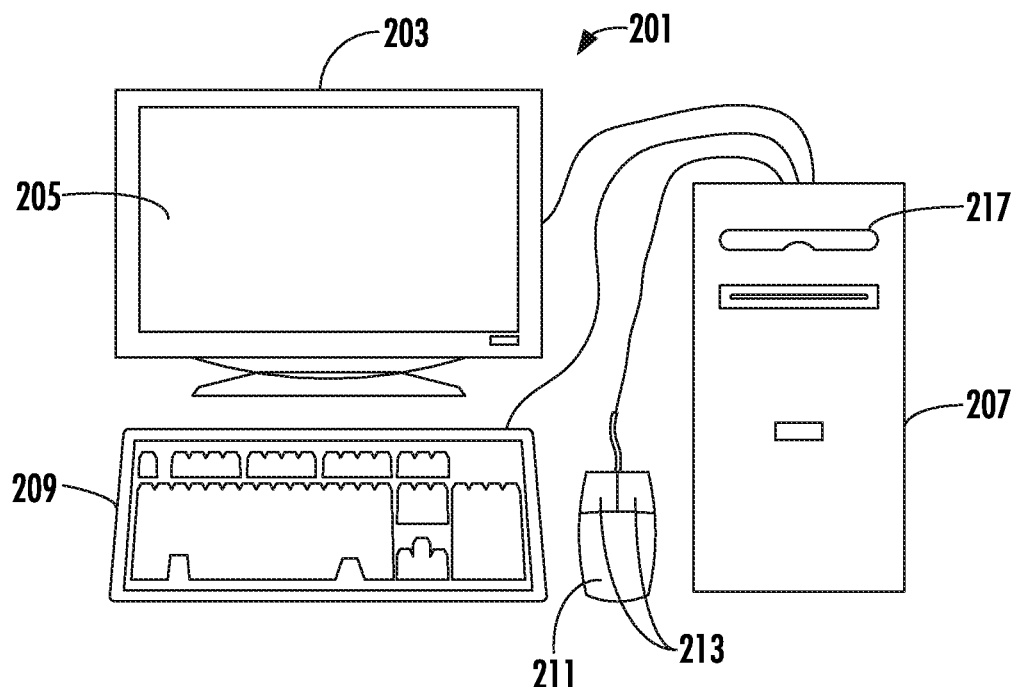
FIG. 2 shows a more detailed diagram of a client or server.

FIG. 2 shows an exemplary client or server system of the present invention. In an embodiment, a user interfaces with the system through a computer workstation system, such as shown in FIG. 2. FIG. 2 shows a computer system 201 that includes a monitor 203, screen 205, enclosure 207 (may also be referred to as a system unit, cabinet, or case), keyboard or other human input device 209, and mouse or other pointing device 211. Mouse 211 may have one or more buttons such as mouse buttons 213.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 207 houses familiar computer components, some of which are not shown, such as a processor, memory, mass storage devices 217, and the like. Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software of the present invention may also be stored or reside on mass storage device 217 (e.g., hard disk, magnetic disk, tape, or CD-ROM). As a further example, code of the invention may be transmitted via wires, radio waves, or through a network such as the Internet.

Figure 3:
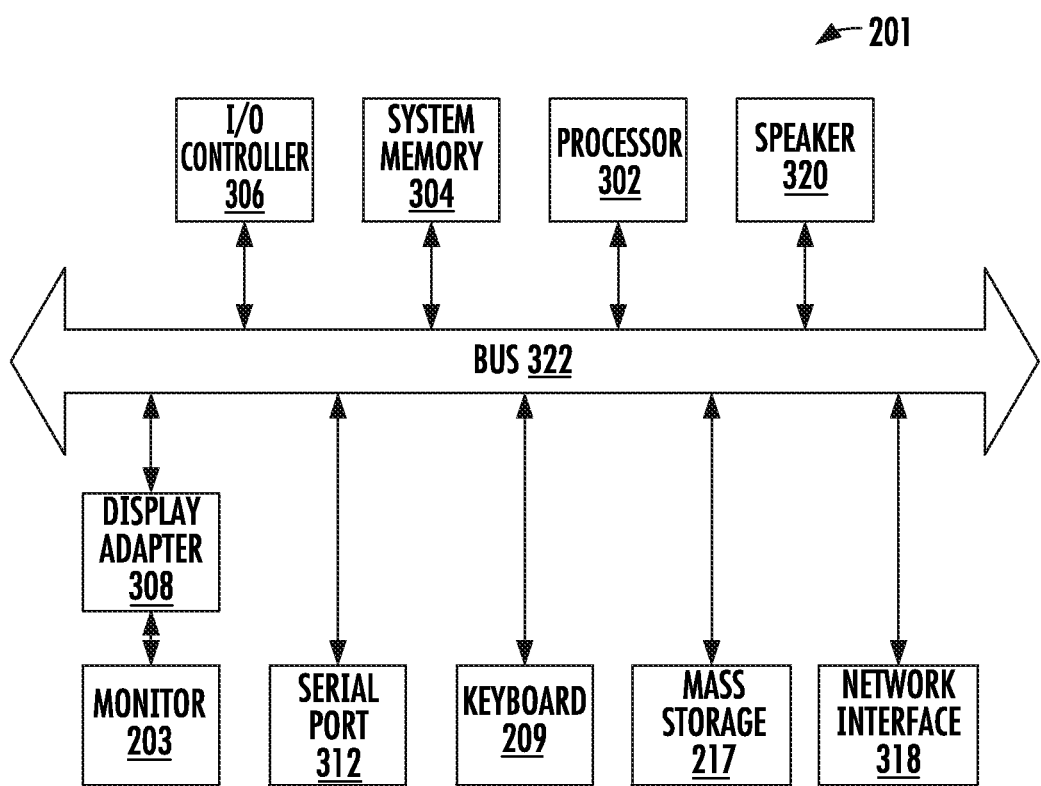
FIG. 3 shows a system block diagram of a computer system.

FIG. 3 shows a system block diagram of computer system 201 used to execute the software of the present invention. As in FIG. 2, computer system 201 includes monitor 203, keyboard 209, and mass storage devices 217. Computer system 501 further includes subsystems such as central processor 302, system memory 304, input/output (I/O) controller 306, display adapter 308, serial or universal serial bus (USB) port 312, network interface 318, and speaker 320. The invention may also be used with computer systems with additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C #, Pascal, Fortran, Perl, Matlab (from MathWorks, www.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

Figure 4:
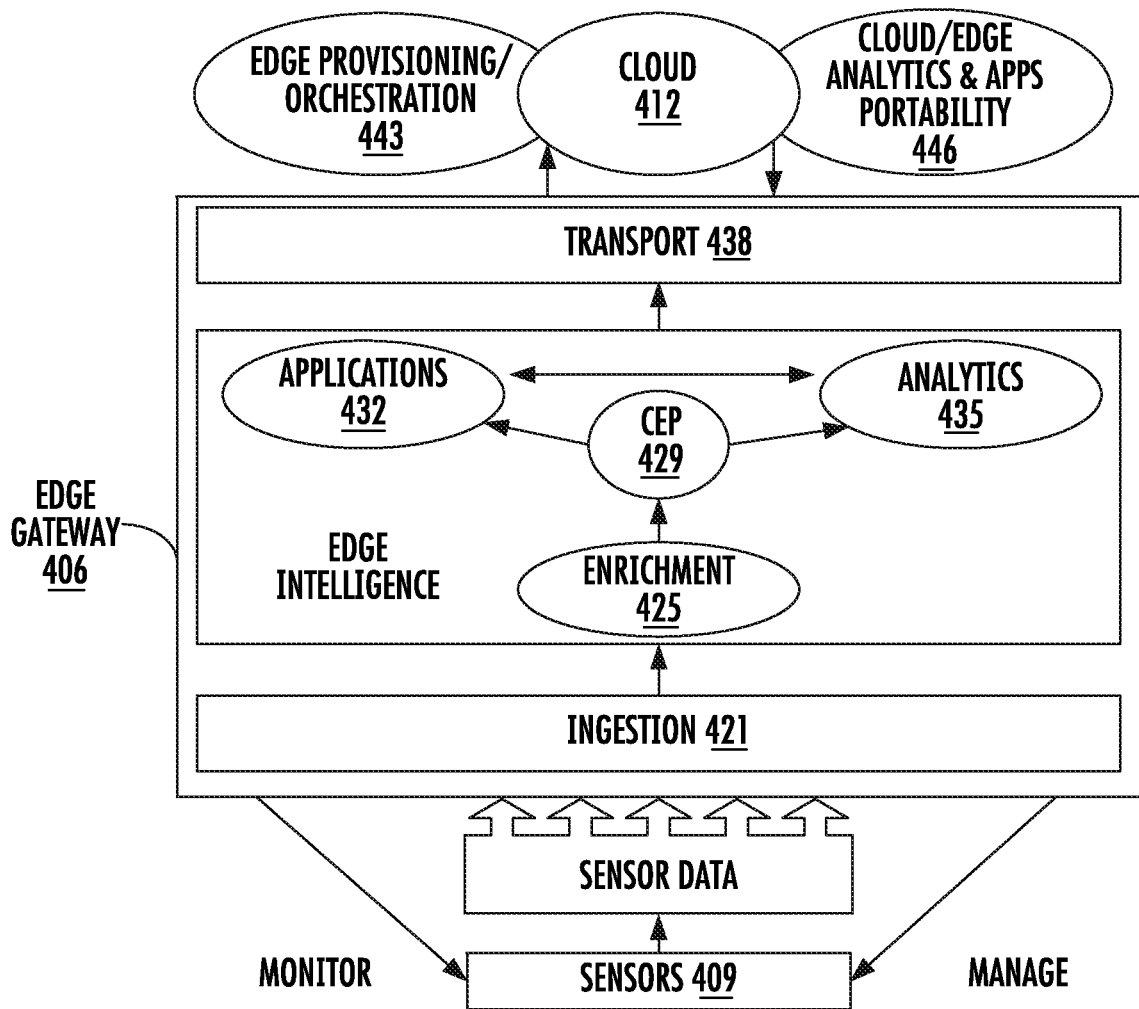
FIG. 4 a block diagram of an edge computing platform, which is between sensor streams and the cloud.

FIG. 4 shows a block diagram of an edge computing platform 406 typically running on an edge gateway or equivalent that is between sensors 409 and cloud 412. The edge computing platform enables deriving edge intelligence that is important for managing and optimizing industrial machines and other industrial Internet of things. Components of the edge gateway include the following: ingestion 421, enrichment 425, complex event processing (CEP) engine 429, applications 432, analytics through an expression language 435, and transport 438. The cloud can include edge provisioning and orchestration 443 and cloud and edge analytics and apps portability 446.

As discussed above, a specific implementation of an edge computing platform is from FogHorn. FogHorn is a leader in the rapidly emerging domain of "edge intelligence." By hosting high performance processing, analytics, and heterogeneous applications closer to control systems and physical sensors, FogHorn's breakthrough solution enables edge intelligence for closed loop device optimization. This brings big data and real-time processing onsite for industrial customers in manufacturing, oil and gas, power and water, transportation, mining, renewable energy, smart city, and more. FogHorn technology is embraced by the world's leading industrial Internet innovators and major players in cloud computing, high performance edge gateways, and IoT systems integration.

Foghorn provides: Enriched IoT device and sensor data access for edge apps in both stream and batch modes. Highly efficient and expressive DSL for executing analytical functions. Powerful miniaturized analytics engine that can run on low footprint machines. Publishing function for sending aggregated data to cloud for further machine learning. SDK (polyglot) for developing edge apps. Management console for managing edge deployment of configurations, apps, and analytics expressions.

FogHorn provides an efficient and highly scalable edge analytics platform that enables real-time, on-site stream processing of sensor data from industrial machines. The FogHorn software stack is a combination of services that run on the edge and cloud.

An "edge" solutions may support ingesting of sensor data into a local storage repository with the option to publish the unprocessed data to a cloud environment for offline analysis. However many industrial environments and devices lack Internet connectivity making this data unusable. But even with Internet connectivity, the sheer amount of data generated could easily exceed available bandwidth or be too cost prohibitive to send to the cloud. In addition, by the time data is uploaded to the cloud, processed in the data center, and the results transferred back to the edge, it may be too late to take any action.

The FogHorn solution addresses this problem by providing a highly miniaturized complex event processing (CEP) engine, also known as an analytics engine, and a powerful and expressive domain specific language (DSL) to express rules on the multitude of the incoming sensor streams of data. Output from these expressions can then be used immediately to prevent costly machine failures or downtime as well as improve the efficiency and safety of industrial operations and processes in real time.

The FogHorn platform includes: Ability to run in low footprint environments as well as high throughput or gateway environments. Highly scalable and performant CEP engine that can act on incoming streaming sensor data. Heterogeneous app development and deployment on the edge with enriched data access. Application mobility across the cloud and edge. Advanced machine learning (ML) and model transfer between cloud and edge. Out of the box, FogHorn supports the major industrial data ingestion protocols (e.g. OPC-UA, Modbus, MQTT, DDS, and others) as well as other data transfer protocols. In addition, users can easily plug-in custom protocol adaptors into FogHorn's data ingestion layer.

FogHorn edge services operate at the edge of the network where the IIoT devices reside. The edge software stack is responsible for ingesting the data from sensors and industrial devices onto a high speed data bus and then executing user-defined analytics expressions on the streaming data to gain insights and optimize the devices. These analytical expressions are executed by FogHorn's highly scalable and small footprint complex event processing (CEP) engine.

FogHorn edge services also include a local time-series database for time-based sensor data queries and a polyglot SDK for developing applications that can consume the data both in stream and batch modes. Optionally, this data can also be published to a cloud storage destination of the customer's choice.

The FogHorn platform also includes services that run in the cloud or on-premises environment to remotely configure and manage the edges. FogHorn's cloud services include a management UI for developing and deploying analytics expressions, deploying applications to the edge using an application known as Docker (www.docker.com), and for managing the integration of services with the customer's identity access management and persistence solutions. The platform will also be able to translate machine learning models developed in the cloud into sensor expressions that can be executed at the edge.

As examples, an application applies real-time data monitoring and analysis, predictive maintenance scheduling, and automated flow redirection to prevent costly damage to pumps due to cavitation events. Another example is wind energy management system using FogHorn edge intelligence software to maximize power generation, extend equipment life, and apply historical analysis for accurate energy forecasting.

Figure 5:
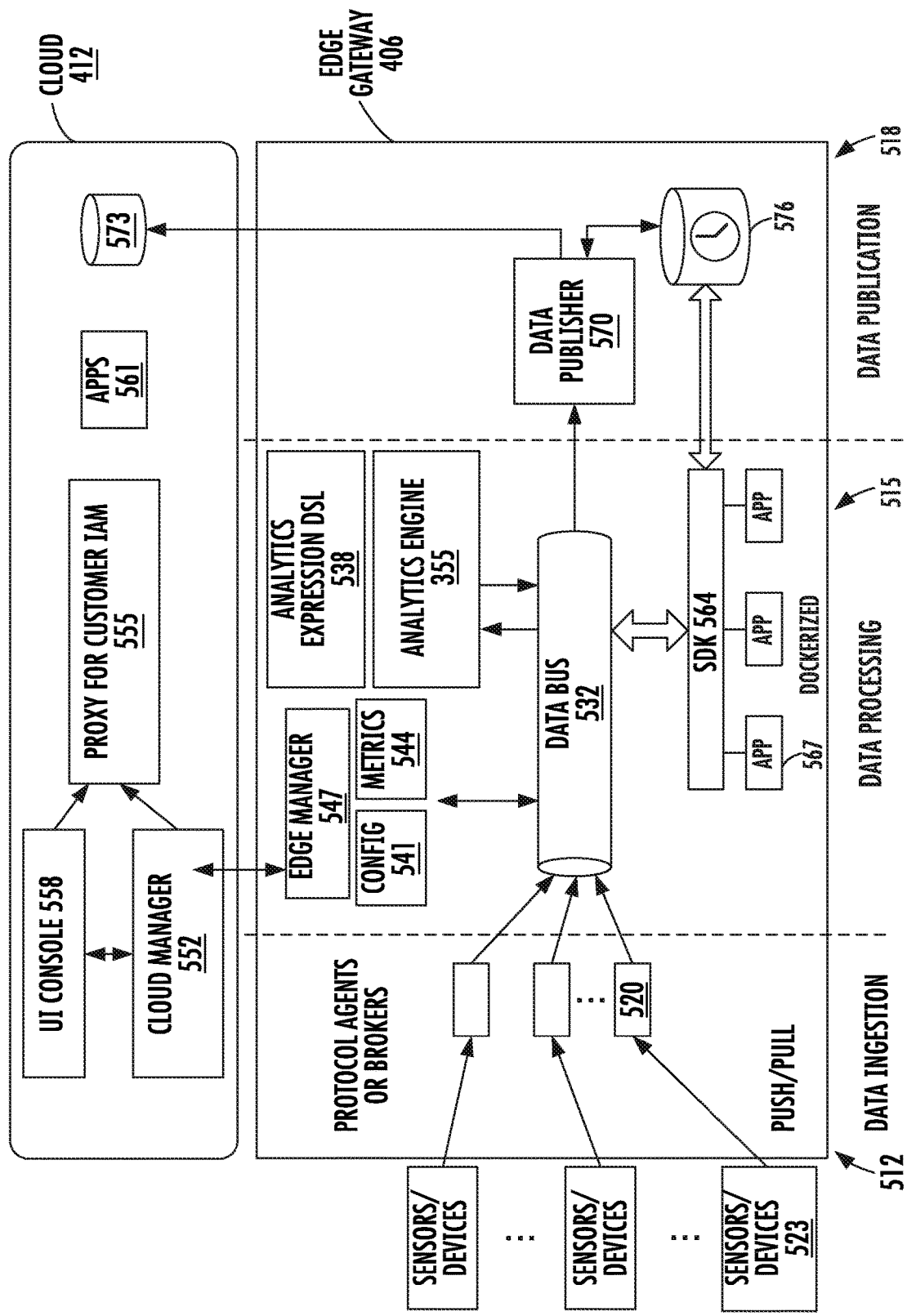
FIG. 5 shows a more detailed block diagram of an edge computing platform including edge analytics.

FIG. 5 shows a more detailed block diagram of an edge computing platform. This platform has three logical layers or sections, data ingestion 512, data processing 515, and data publication 518. The data ingestion components include agents 520 that are connected to sensors or devices 523 that generate data. The agents collect or ingest data from the sensors via one or more protocols from the respective protocol servers. The agents can be clients or brokers for protocols such as, among others, MQTT, OPC UA, Modbus, and DDS. The data provided or output by the sensors is typically a binary data stream. The transmission or delivery of this data from the sensors to the agents can be by push or pull methods.

Push describes a style of communication where the request for a given transaction is initiated by the sender (e.g., sensor). Pull (or get) describes a style of communication where the request for the transmission of information is initiated by receiver (e.g., agent). Another communication technique is polling, which the receiver or agent periodically inquires or checks the sensor has data to send.

MQTT (previously MQ Telemetry Transport) is an ISO standard publish-subscribe-based "lightweight" messaging protocol for use on top of the TCP/IP protocol. Alternative protocols include the Advanced Message Queuing Protocol, the IETF Constrained Application Protocol, XMPP, and Web Application Messaging Protocol (WAMP).

OPC Unified Architecture (OPC UA) is an industrial M2M communication protocol for interoperability developed by the OPC Foundation. It is the successor to Open Platform Communications (OPC).

Modbus is a serial communications protocol originally published by Modicon (now Schneider Electric) in 1979 for use with its programmable logic controllers (PLCs). Simple and robust, it has since become for all intents and purposes a standard communication protocol. It is now a commonly available means of connecting industrial electronic devices.

Data processing 515 includes a data bus 532, which is connected to the agents 520 of the data ingestion layer. The data bus is the central backbone for both data and control messages between all connected components. Components subscribe to the data and control messages flowing through the data bus. The analytics engine 535 is one such important component. The analytics engine performs analysis of the sensor data based on an analytic expressions developed in expression language 538. Other components that connect to the data bus include configuration service 541, metrics service 544, and edge manager 547. The data bus also includes a "decoder service" that enriches the incoming data from the sensors by decoding the raw binary data into consumable data formats (such as JSON) and also decorating with additional necessary and useful metadata. Further, enrichment can include, but is not limited to, data decoding, metadata decoration, data normalization, and the like.

JSON (sometimes referred to as JavaScript Object Notation) is an open-standard format that uses human-readable text to transmit data objects consisting of attribute-value pairs. JSON is a common data format used for asynchronous browser or server communication (AJAJ) or both. An alternative to JSON is XML, which is used by AJAX.

The edge manager connects to cloud 412, and in particular to a cloud manager 552. The cloud manager is connected to a proxy for customer identity and access management (IAM) 555 and user interface console 558, which are also in the cloud. There are also apps 561 accessible via the cloud. Identity and access management is the security and business discipline that enables the right individuals to access the right resources at the right times and for the right reasons.

Within data processing 515, a software development kit (SDK) 564 component also connects to the data bus, which allows the creation of applications 567 that work that can be deployed on the edge gateway. The software development kit also connects to a local time-series database to fetch the data. The applications can be containerized, such as by using a container technology such as Docker.

Docker containers wrap up a piece of software in a complete file system that contains everything it needs to run: code, runtime, system tools, and system libraries—anything that can be installed on a server. This ensures the software will always run the same, regardless of the environment it is running in.

Data publication 518 includes a data publisher 570 that is connected to a storage location 573 in the cloud. Also, applications 567 of the software development kit 564 can access data in a time-series database 576. A time-series database (TSDB) is a software system that is optimized for handling time series data, arrays of numbers indexed by time (e.g., a date-time or a date-time range). The time-series database is typically a rolling or circular buffer or queue, where as new information is added to the database, the oldest information is being removed. A data publisher 570 also connects to the data bus and subscribes to data that needs to be stored either in the local time-series database or in the cloud storage.

Figure 6:
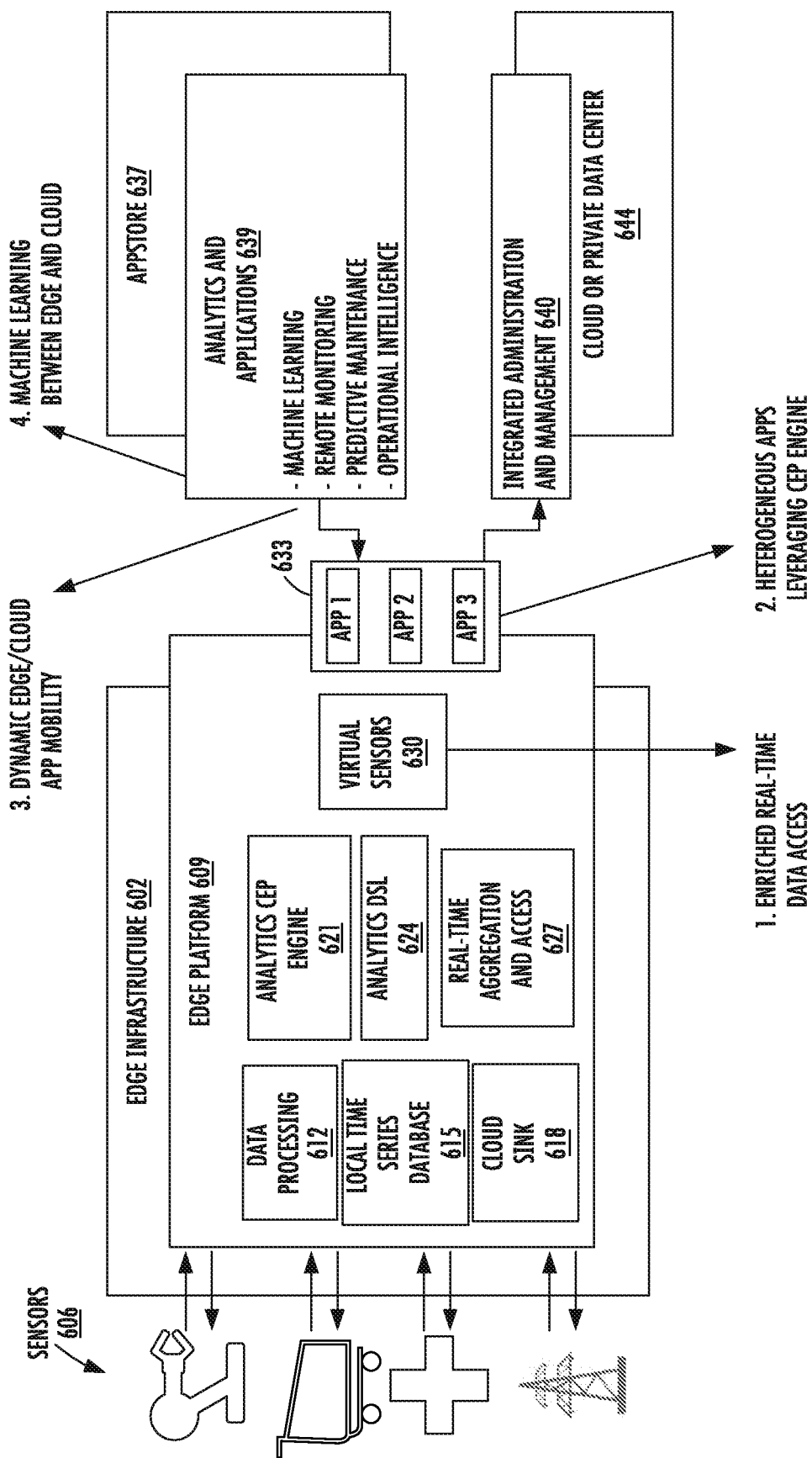
FIG. 6 shows an operational flow between edge infrastructure and cloud infrastructure.

FIG. 6 shows an operational flow between edge 602 and cloud infrastructures. Some specific edge infrastructures were described above. Data is gathered from sensors 606. These sensors can be for industrial, retail, health care, or medical devices, or power or communication applications, or any combination of these.

The edge infrastructure includes a software platform 609, which has data processing 612, local time-series database 615, cloud sink 618, analytics complex event processing engine (CEP) 621, analytics real-time streaming domain-specific language (DSL) 624 (e.g., the Vel language by Foghorn), and real-time aggregation and access 627. The platform can include virtual sensors 630, which are described below in more detail. The virtual sensors provide enriched real-time data access.

The platform is accessible via one or more apps 633, such as apps or applications 1, 2, and 3, which can be developed using a software development kit or SDK. The apps can be heterogeneous (e.g., developed in multiple different languages) and leverage complex event processing engine 621, as well as perform machine learning. The apps can be distributed using an app store 637, which may be provided by the edge platform developer or the customer of the edge platform (which may be referred to as a partner). Through the app store, users can download and share apps with others. The apps can perform analytics and applications 639 including machine learning, remote monitoring, predictive maintenance, or operational intelligence, or any combination of these.

For the apps, there is dynamic app mobility between edge and cloud. For example, applications developed using the FogHorn software development kit can either be deployed on the edge or in the cloud, thereby achieving app mobility between edge and cloud. The apps can be used as part of the edge or as part of the cloud. In an implementation, this feature is made possible due to the apps being containerized, so they can operate independent of the platform from which they are executed. The same can be said of the analytics expressions as well.

There are data apps that allow for integrated administration and management 640, including monitoring or storing of data in the cloud or at a private data center 644.

A physical sensor is an electronic transducer, which measures some characteristics of its environment as analog or digital measurements. Analog measurements are typically converted to digital quantities using analog to digital converters. Sensor data are either measured on need based (polled) or available as a stream at a uniform rate. Typical sensor specifications are range, accuracy, resolution, drift, stability, and other attributes. Most measurement systems and applications utilize or communicate the sensor data directly for processing, transportation, or storage.

The system has a "programmable software-defined sensor," also called a virtual sensor, which is a software based sensor created using an analytics expression language. In an implementation, the analytics expression language is Fog-Horn's analytics expression language. This expression language is known as Vel. The Vel language is implemented efficiently to support real-time streaming analytics in a constrained low footprint environment with low latencies of execution. For example, a latency of the system can be about 10 milliseconds or less.

In an implementation, the programmable software-defined sensor is created with a declarative application program interface (API) called a "sensor expression language" or SXL. A specific implementation of an SXL language is Vel from FogHorn. An Vel-sensor is a Vel-sensor created through this construct, and provides derived measurements from processing data generated by multiple sources including physical and Vel-sensors. In this application, Vel and SXL are used interchangeably.

A Vel sensor can be derived from any one of or a combination of these three sources:

1. A single sensor data.

1.1. A virtual or Vel sensor derived from a single physical sensor could transform the incoming sensor data using dynamic calibration, signal processing, math expression, data compaction or data analytics, of any combination.

2. Multiple physical sensor data.

2.1. A virtual or Vel sensor or derived as a transformation (using the methods described above) from multiple heterogeneous physical sensors.

3. A combination of physical sensor data and virtual sensor data made available to the implementation of the Vel-sensor apparatus.

Vel sensors are domain-specific and are created with a specific application in mind. A specific implementation of Vel programming interface enables applications to define data analytics through transformations (e.g., math expressions) and aggregations. Vel includes a set of mathematical operators, typically based on a programming language. Vel sensors operate at runtime on data by executing Vel constructs or programs.

Creation of Vel Sensors. Vel sensors are designed as software apparatus' to make data available in real-time. This requires the execution of applications developed with the Vel in real-time on embedded compute hardware to produce the Vel-sensor data at a rate required by the application. The system includes a highly efficient execution engine to accomplish this.

Benefits of Vel sensors include:

1. Programmability. Vel makes Vel sensors programmable to synthesize data to match specific application requirements around data quality, frequency and information. Vel-sensors can be widely distributed as over-the-air software upgrades to plug into data sourced from physical sensors and other (e.g., preexisting) Vel sensors. Thus application developers can create a digital infrastructure conducive to the efficient execution of business logic independent of the layout of the physical infrastructure.

2. Maintainability or Transparency. Vel-sensors create a digital layer of abstraction between applications and physical sensors, which insulates developers from changes in the physical infrastructure due to upgrades and services to the physical sensors.

3. Efficiency: Vel-sensors create efficiencies in information management by transforming raw data from physical sensors into a precise representation of information contained in them. This efficiency translates into efficient utilization of IT resources like compute, networking, and storage downstream in the applications.

4. Real-time data: Vel-sensors provide real-time sensor data that is computed from real-world or physical sensor data streams. This makes the data available for applications with minimum time delays.

Implementation. The system has architected a scalable, real-time implementation of Vel-sensors based on a Vel interface. Vel includes operators supported by Java language and is well integrated with physical sensors and their protocols.

The system brings a novel methodology for precisely expressing the operations on physical sensors' data to be executed. This declarative expression separates the definition of the digital abstraction from the implementation on the physical sensors.

Given a set of streams of data of varying types and a set of functions meant to react to and handle specific patterns of data in those streams, this invention is a technique to describe and translate those functions such that they can be invoked appropriately and efficiently as data arrives in the streams.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a match can be detected and a handler function applied is of utmost importance, and where there are limited storage and computing resources to devote to the execution.

EXAMPLE

From a given stream of integers, we wish to match one or more non-zero values, followed by one or more zeros. When this pattern has been matched, we wish to compute the sum of the non-zero values and write the result to another stream.

We could write the pattern-matching portion of this problem in a regular expression notation, and then separately write the computation of the sum as an expression of arithmetic. As it happens, the Vel programming language, designed for use in dataflow applications in edge computing, allows us to write the whole transform in a unified notation, thus:

```
stream("output") =
  ( a:{!= 0} .. {>0}, :0 .. {>0} -> sum(a) )
  from stream("input")
```

Figure 7:
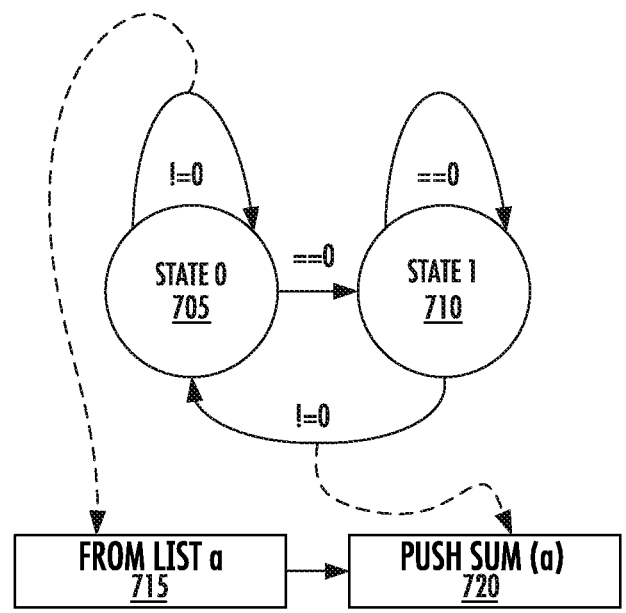
FIG. 7 shows an enhanced nondeterministic finite automaton (NFA) converted to a deterministic finite automaton (DFA) and state-reduced machine.

The technique would translate the above function parameterization into a state machine. It would then implement the match as a deterministic finite automaton based on that state machine, and feed the resulting matches to the summing expression. This flow is depicted in FIG. 7. This is a state 0 705, state 1 710, "from list a" block 715, and "push sum(a)" block 720.

This problem can be solved by generating a matching function for each handler function. The matching function accepts as input a window of data from the streams and returns true for a match and false for a nonmatch. As data flows through the windows, the matching functions must be applied repeatedly until a match is found. Once a match is found, the handler function is applied.

This solution arises because the handler functions are specified in a manner similar to that used for database queries. An SQL-like WHERE-clause provides a Boolean expression describing the conditions for match and the matching function is a direct compilation of this expression.

The separate matching functions must be evaluated individually as new data flows into the stream buffers. Matches are determined for each function independently.

Using a state machine to perform the match is more efficient than repeatedly applying multiple, arbitrary Boolean expressions.

The present invention derives a state machine from a pattern description language that declares the parameters of a function. The derived state machine more efficiently detects matches in a data stream than conventional Boolean expression matching functions.

The derived state machine may also implement a set of handler functions for matches detected in the data stream. Multiple matching and corresponding handler functions may be combined and reduced to a single state machine that efficiently recognizes matches for any handler function.

The derived state machine may also be augmented to include free (epsilon) transitions through additional nodes without altering the sequence recognized by the state machine.

Transitioning through such an additional node may trigger various actions on the data. For example, it may trigger collection of the data in the shift buffer of the deterministic finite automaton (DFA) or stack machine into a holding area. These data may later form the basis for arguments to function application.

This application uses the term DFA, but these automatons or units may be referred to stack machines. Strictly speaking, deterministic finite automaton implies finite performance in space. However, an automaton in this patent is not necessarily finite, but can be nonfinite, yet still simple. Therefore, the DFAs as described in this patent may be nonfinite.

Transitioning through such an additional node may also trigger the invocation of a handler function, using the data captured in prior nodes as function application arguments.

Translation from a script combining aspects of regular expressions and value expressions gives rise to an augmented state machine or DFA which can efficiently match patterns and compute values.

The resulting combined matching or computing algorithm is more efficient than separate organization of pattern matching and value computing.

A method for constructing the DFA or state machine from the lexical source, beginning with a nondeterministic finite automaton (NFA) and then reducing it to a minimal DFA. The purpose of the DFA is to recognize a pattern within series of input data. For the purposes of this discussion, we will call the data flowing through the state machine tokens and a particular pattern recognized by the DFA as a language of the tokens.

Figure 8:
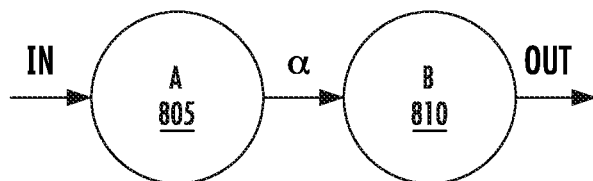
FIG. 8 shows a transition from state A to B upon receipt of the token alpha.

Consider the portion of the NFA in FIG. 8. This portion also happens to be a DFA, but this is not important for the purpose of this example. It transitions from state A 805 to state B 810 upon receipt of the token alpha.

Figure 9:
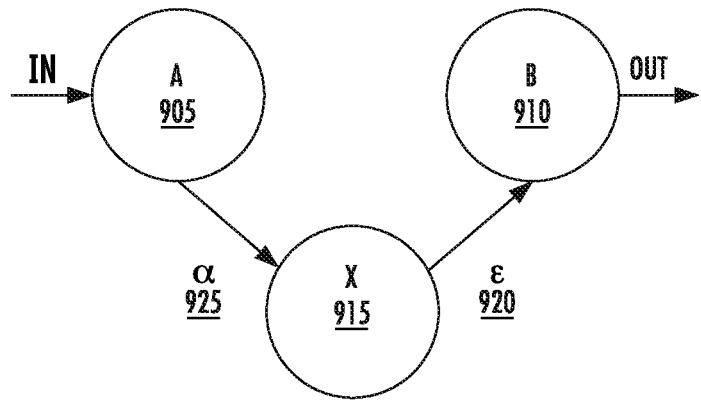
FIG. 9 shows a transition from state A to B through a extra state transition, state X.

We may augment this NFA by adding an additional node with an epsilon transition 920, as shown in FIG. 9. An epsilon edge may be followed at any time—for free, as it were—regardless of the state of input.

The presence of one or more epsilon edges make the state machine nondeterministic; however, epsilon edges may be removed by an algorithm, with the NFA reduced by this means to an equivalent DFA which can be implemented efficiently by a table-driven method. We can therefore introduce these extra epsilon transitions while still retaining a strategy for efficient implementation.

The state machine in FIG. 9 will transition from state A 905 to state X 915 upon receipt of token alpha 925, and can then proceed at will from state X to state B 910 at will. The impetus of alpha still results in a transition from state A to state B, just as it did in the simpler machine in FIG. 8, and no additional inputs are required to achieve this transition. It can therefore be seen that the NFA in FIG. 9 translates the same language that in FIG. 8. It simply takes an extra state transition, through state X, in order to do so.

The extra state is useful in that we may associate with it the performance of side-effects. So long as these side-effects alter neither the definition of the state machine nor the data flowing through the state machine, the additional node will have no effect on the recognition of language, but the side-effects can do additional work.

In a data flow reaction implementation, the additional work could include any number of useful actions on or using the data. In one exemplary implementation, the work can include:

1. Examining the data flowing through the node and emitting a copy of it to an outside collector;

2. Applying a transform to data as it flows through the node and collecting the transformed data and in a temporary buffer; OR 3. Flushing collected data from a temporary buffer into an additional transform and pushing the result to another DFA or stack machine.

As an example, let us consider the source fragment:
(a:{!=0} ... {>0}, :0 ... {>0}->sum(a))

The fragment describes a pattern consisting of two terms: (1) A first term, called a, which matches one or more recurrences of nonzero values. (2) A second term, not given a name, which matches one or more recurrences of zeros.

Let us suppose we wish to use this as the basis for a reaction. We will read values from a source called in, and when we recognize the fragment's pattern among the input, we will react by evaluating the fragment's right-hand side and pushing the result to a destination called out.

For example, if in consisted of the values [101, 202, 303, 0, 0], we would match the pattern by binding the first three values to a and the last two values to the anonymous second term. We would then evaluate the right-hand side by applying the sum function to the list of values bound to a, [101, 202, 303], returning 606. We would then push 606 to out.

The translation of a functional pattern such as in this example in accordance with this invention may be implemented via a computer-executed translation program. The program would have to perform two different forms of translation: translating the function-oriented portion "sum (a)" into a block of executable statements that would perform the computation, and translating the pattern-oriented portion "a: {!=0} ... {>0}, :0 ... {>0}" into a DFA or stack machine which would recognize the pattern, capture the arguments, and invoke the function. Let us call the former task function translation and the second task pattern translation.

Function translation is well understood by computer programmers who specialize in the writing of compilers and interpreters. Pattern translation, the fitting together of function translation and pattern translation, and the subsequent automation of pattern recognition and function dispatch, are the subjects of this invention.

Function translation consists of accepting a source text, breaking the text into tokens, and then, guided by a grammar, arranging the tokens such that they form the leaves of an abstract syntax tree (AST) which describes the syntactic content of the source text. The abstract syntax tree is then traversed by a series of algorithms which ultimately produce the blocks of instructions required to evaluate the functions described by the source.

Figure 10:
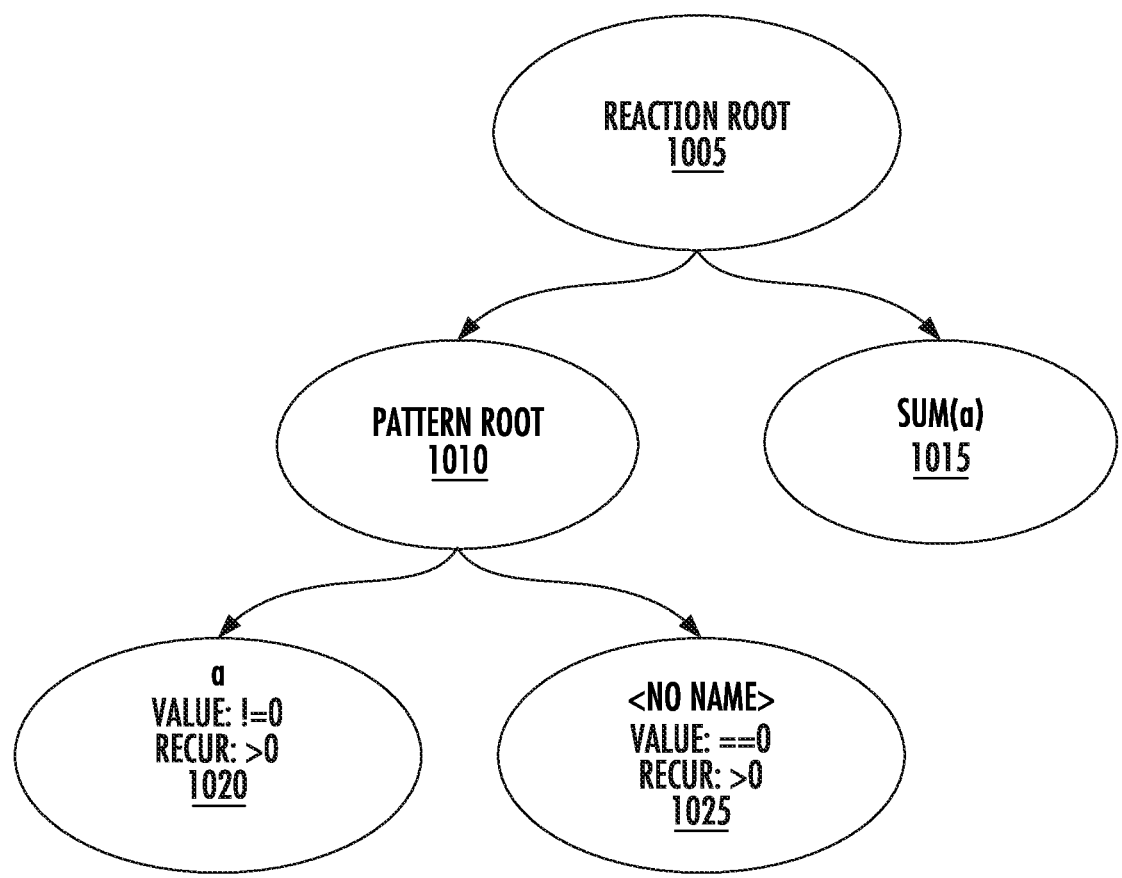
FIG. 10 shows an example of an abstract syntax tree formed by the syntactic analysis.

Pattern translation begins with the abstract syntax tree formed by the syntactic analysis described above. The abstract syntax tree will contain one or more nodes which form the roots of pattern declarations. For example, our pattern above might consist of a single root node with two children, each child describing one term of the pattern, as depicted in the lower-left portion of FIG. 10. In FIG. 10, there is a reaction root node 1005, pattern root node 1010, sum(a) node 1015, a node 1020, and <no name> node 10.

Recognize that a pattern term node, specifying as it does an example to match and a recurrence with which to match it, carries the same information as does a term in a regular expression. In addition, the sequence of child nodes, taken together and in order, specifies the same information as a linear conjunction of regular expression terms. A linear conjunction of regular expression or regular expression terms can be translated terms into an NFA. We have discovered the same algorithm can be used in the present invention, with pattern terms standing in for regular expression terms.

Once the basic NFA is so formed, we may inject into it our extra, side-effect-inducing states in positions where actions is required by pattern terms, and after the accepting state, to invoke reaction's function.

To continue our example, term a requires that we collect a list of the values which match it so we may eventually pass them as an argument to the reaction's function. We thus apply the transformation depicted in FIG. 9 to the NFA state resulting from term a and use the new state to do the work of collecting matching terms. We then apply the transformation again, this time to the NFA's accepting state, and use the collected values to call the reaction's function, push the result to the reaction's consumers, and clear the collection buffer. After this enhanced NFA is converted to a DFA and state-reduced, we are left with the machine depicted in FIG. 7.

The steps are used to convert an NFA to a DFA, to state-reduce a DFA, and to render a DFA as a state-action table, as is the algorithm for using a state-action table to drive a state-machine engine.

The NFA produced by a technique this invention can be transformed and rendered into a table. However, the resulting table includes an extra column consisting of the side-effect lambda to be executed when passing through each state. The automation engine that uses such a state-action-lambda table will, unlike other techniques, execute the additional lambda each time it undergoes a transition.

A method for describing and translating reactive functions for use data flow computing environments, includes: (i) identifying a reactive function; (ii) identifying the pattern of parameters providing inputs to the function; (iii) identifying the expression to be evaluated based on the arguments passed to the function; (iv) translating the pattern of parameters into a state machine capable of recognizing the sequences of input which match the pattern; (v) augmenting the state machine with additional states which do the work of collecting and transforming input data to prepare it for use as arguments to the function; and (vi) reducing the state machine to a state-action-effect table capable of automation by simple software or hardware.

Given a set of functions and a sequence of values as arguments, this invention is a method to dispatch execution to the function which the arguments match, or to determine that the arguments match none of the functions. This method is novel in that, by combining value expressions, type expressions, and regular expressions, it can match without ambiguity any sequence of values representable in the type system.

The need to solve this type of problem arises in the development of translators, interpreters, and compilers and is closely related to the notion of polymorphic dispatch. If one considers the elements forming an arbitrary prefix of the sequence to constitute single object (a tuple), then the task of dispatching to the correct function can be thought of as equivalent to the polymorphic dispatch of method of the tuple's class.

This invention is applicable to any situation in which a this sort of polymorphic dispatch is required. This includes all manner of event-driven or reactive programs which must respond to a stream of data originating from outside of the program. The invention will be particularly useful in applications relating to the real-time processing of multiple streams of data, such as often occurs in edge or fog computing or networking environments.

Regular expressions are commonly used to detect strings which conform to a particular pattern. There are a number of regular expression languages, most closely related, and many tools which implement efficient matching engines based on them. These are generally limited to matching sequences of characters.

There are other pattern-based notations, which operate on domains other than strings. One example is XPATH, which describes patterns in XML documents. These notations are often less complete and less powerful than regular expressions and are tailored for a specific domain.

Some programming languages implement runtime polymorphic dispatch by means of a type-based pattern matching system. Multiple overloads of a function are defined, each taking a different pattern of types and values, and dispatch is resolved at runtime by matching the types and values of the arguments against the patterns of the function parameters. Haskell is one such programming language.

Language-specification languages describe context-free grammars as a series production rules. These rules constitute the syntax of the language. A compiler-compiler translates these rules into a table-driven deterministic finite state machine which can recognize instances of the language. Bison is an example of such a language-specification language and its associated compiler-compiler.

Grammar-driven pattern-matching systems such as regular expressions have the benefit of efficient execution due to being representable as simple machines such as deterministic finite automata (DFAs) or state machines, but they lack the broad modeling capabilities of a full type system. Type-driven pattern-matching systems such as that used in Haskell have much richer modeling capabilities, but often sacrifice what is representable in favor of a reasonably efficient implementation, yet still are not as efficient as the high-speed matching systems based on DFAs.

This invention deals with a type-based matching system which can match against all states representable in among its types and yet may still be implemented efficiently as a state machine. A generalized pattern of types and states is translated into table-driven state machine which will efficiently recognize instances of the pattern.

Defining function parameters based on these patterns allows a function to match exactly any arbitrary pattern of data and, in matching, bind its arguments from among the matching data elements. The state machine describing the matching pattern for a union of functions is formed by merging the state machines of the member functions, then reducing the result to a minimal number of states. Disambiguation between overloads, or detection of an overall nonmatch, occurs as early as possible in a sequence, speeding the resolution of the function application. A match may also be delayed until as late as possible in a sequence, producing the "greedy" version of the function which will accept as much input as possible.

A method combines value expressions, type expressions, and regular expressions, such that it can match without ambiguity any sequence of values representable in the type system. This method resolves a function application and dispatches to the correct overload with a minimal number of decisions. This method allows an overloaded function application to perform the same work as context-free grammar, recognizing a specific language by recursively recognizing grammatical subcomponents and applying transformation functions thereto.

This method is applicable in connection with a type system including a plurality of different types, for example: (1) A set of foundational monomorphic types, such as integers, real numbers, and strings. (2) A set of polymorphic types and their constructors, in particular a polymorphic set type with certain properties we shall shortly discuss. (3) A sum type. (4) A product type in the form of a record. (5) A product type in the form of a pattern, which is a generalization of a tuple to including repetition of its fields. (6) A lambda type, which maps a pattern type to any type. (7) And, a poly-lambda type, consisting of a list of lambdas.

A set is a polymorphic type consisting of one or more ranges of elements. The set type is parameterized on the type of element it contains, such that a set of integers is a distinct type from a set of strings, for example. A set type is further characterized by limits on its contents. In particular, a set type may be constrained to be finite or infinite or to be closed or open on its left- or right-hand sides, or any combination of these. Consider the following examples of sets of integers:

or a string. The union of unions flattens, so that the type expression (int or string) or (int or real) is equivalent to int or real or string. The order of the types in a union is not important, but for the sake of a canonicality, we present all union types here such that their constituents are in alphabetical order.

Our record type uses named fields and associates each field with a type. For example: {birthday: date; first_name: string; last_name: string}. A record type always has a finite number of fields and each field has a name unique within the type. The order of fields isn't important; {x: int; y: int} is the same as {y: int; x: int}; however, as we did for unions, we will present record types with their constituents in alphabetical order.

Note that the type of a record is itself a record. The value {x: 3; y: 4} has the type {x: int; y: int}.

TABLE A

| Notation | Length | Closedness | Meaning |
| --- | --- | --- | --- |
| [1] | 1 | closed on the left and right | A set consisting of the single integer 1. |
| [1, 2, 3] | 3 | closed on the left and right | A set consisting of three integers: 1, 2, and 3. |
| [5000 . . . 6000] | 1001 | closed on the left and right | The integers from 5000 to 6000, inclusive. |
| [10 . . .] | infinite | closed on the left, open on the right | All the integers equal to or greater than 10. |
| [. . . 10] | infinite | open on the left, closed on the right | All the integers less than or equal to 10. |
| [>5] | infinite | closed on the left, open on the right | All the integers greater than 5. The same as [6 . . .]. |
| [>=5] | infinite | closed on the left, open on the right | All the integers greater than or equal to 5. The same as [5 . . .]. |
| [<5] | infinite | open on the left, closed on the right | All the integers less than 5. The same as [. . . 4]. |
| [<=5] | infinite | open on the left, closed on the right | All the integers less than or equal to 5. The same as [. . . 5]. |
| [!=5] | infinite | open on the left and right | All the integers except 5. |
| [>=1] and [<=3] | 3 | closed on the left and right | A set consisting of three integers: 1, 2, and 3. The same as [1, 2, 3] or [1 . . . 3]. |
| [<=−10] or [>=10] | infinite | open on the left and right | All the integers with an absolute magnitude greater than or equal to 10. |
| not [1 . . . 3] | infinite | open on the left and right | All the integers except 1, 2, and 3. |

There is no distinction between [>=1] and [>0] because the elements are of integer type and integers are distinctly enumerable. If the elements were of a nonenumerable type, such as real numbers or strings, then the explicit inclusion or inclusion of a specific endpoint becomes necessary. For example, the set [>="cat"] consists of the string "cat" and of all strings which sort lexicographically after "cat."

We may use an instance of a set as a type. The instances of such a type must be members of the set. For example, the set [>0], used as a type, would allow only positive integers as values. In fact, one may think of all types in this way. For example, the monomorphic integer type could be considered a set type consisting of the set of all integers.

Our sum type is a simple union of other types. For example, the type int or string is the sum of its two constituent types. Any instance of any of a sum type's constituent types is also an instance of the sum type. This allows us, for example, to describe the type list(int or string), which is a list of values, each of which is either an integer Our pattern type is similar to a tuple in that it is defined as a sequence of types; however, while a tuple implicitly assumes each of its elements appears exactly once, a pattern permits each of its elements to have a recurrence. The recurrence is given as a set of integers. For example, the pattern <a: int # [1 . . . 3]; b: string # [1 . . . 3]> matches one to three integers followed by one to three strings.

When used as the parameters of a lambda, the fields of a pattern give rise to arguments which are bound within the lambda's evaluation. For example, after we matched the pattern given in the previous paragraph, we would have two local identifiers, a and b, in scope. The value of A would be a list of one to three integers and the value of b would be a list of one to three strings.

It is also valid for one or more fields in a pattern to have no name. A field with no name is matched but no value for it is bound as an argument. For example, if we matched <a: int # [1 . . . 3]; string # [1 . . . 3]>, we would match as before—one to three integers followed by one to three strings—and bind the integers as a list called a, but we would not bind the strings.

A pattern may be of infinite length. For example the pattern <a: int # [1 . . . ]> will match one or more integers with no upper limit. This is valid; however, if used to process an endless input stream, an infinite pattern must be paired with some other trigger, such as a time interval, which will indicate when to stop collecting values.

Generally a pattern will consume the data that it matches; however, it is possible to consume only a subset of that data, or none at all. A pattern may contain at mark, called the peek point, beyond which it will match data and bind arguments, but not consume from the input stream. For example, the pattern <a: int; b: int; peek; c: int> will match three integers and bind three local identifiers, but only consume two integers from the input.

It is valid to have a record with no fields or a pattern with no fields. These two cases are meaningfully indistinguishable from each other, as they both denote the product type. Lexically, we designate this concept with the keyword void. The void is a unique value; it is also its own type. Used in a union, the void gives rise to the notion of an optional type, such as int or void, meaning a value which, if present is an int, but might not be present at all.

For our purposes, type-matching is structural, not nominative. A type does not have a name, only a description. Two types with the same description are the same type. A type whose description is a subset of that of another type is a generalization of that type. For example, consider the types {x: int; y: int} and {x: int; y: int; z: int}. The type with two fields—x and y—is a subset of the type with three fields—x, y and z—and thus the former may be considered a generalization of the latter. This is also true for patterns. A pattern which is a prefix of another is also its generalization.

Our lambda type maps an input pattern to an output type. For example <int # [1 . . . 3]>→int, which is the type of a function which takes one to three integers and returns an integer. Our poly-lambda type is made up of a list of lambda types. The order of the lambdas does matter here. When we are resolving a poly-lambda application, we will dispatch to the first of its constituent lambdas which matches.

Defined in this way, the pattern-matching required to dispatch a poly-lambda may be reduced to a deterministic finite automaton (DFA). To demonstrate how, we will use a method of state machine construction as a basis for comparison and augment it as necessary. A description involves first constructing a nondeterministic finite automaton (NFA) and then reducing it to a DFA; however, in practice, this can generally be done in a single step.

As previously discussed, this application uses the term DFA, but these automatons or units may be referred to stack machines. Strictly speaking, deterministic finite automaton implies finite performance in space. However, an automaton in this patent is not necessarily finite, but can be nonfinite, yet still simple. Therefore, the DFAs as described in this patent may be nonfinite.

Figure 11:
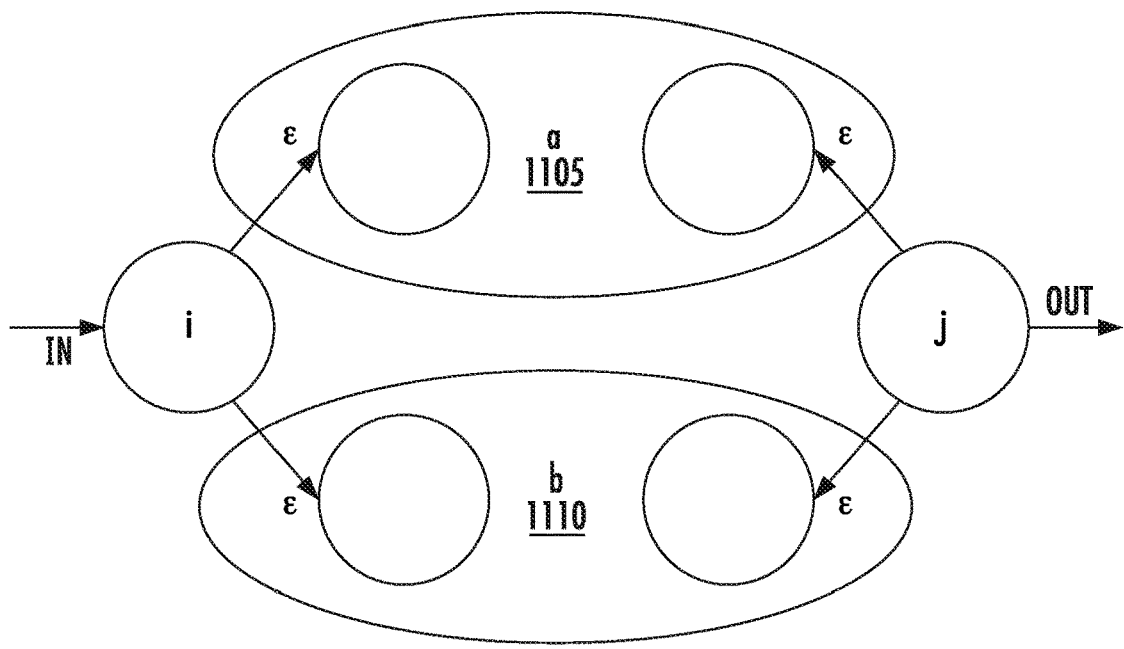
FIG. 11 shows a subgraph for alternation.

First, the constituents of the poly-lambda—the individual lambda patterns—must be thought of as elements of an alternation. In translating a regular expression, the syntax a|b (a OR B) is an alternation: match a 1105 or match b 1110. In our case, a AND b are each lambda patterns. We construct a subgraph for alternation as per FIG. 11.

Figure 12:
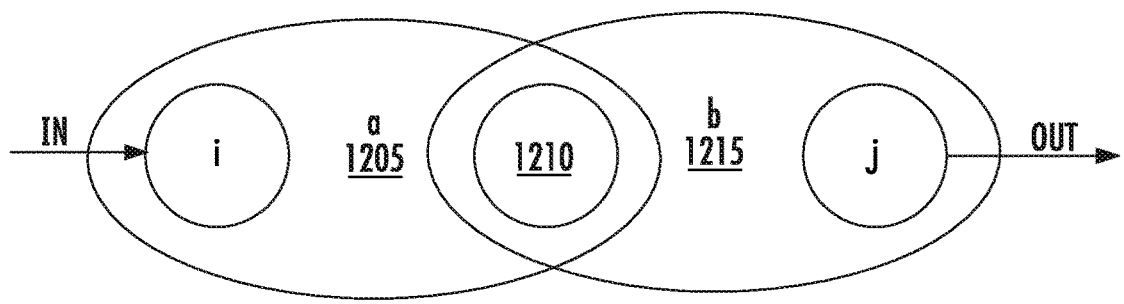
FIG. 12 shows a subgraph for conjunction.

We represent the fields of an individual pattern first by conjunction. In translating a regular expression, the syntax ab 1210 is a conjunction: match a 1205, followed by b 1215. In our case, a AND b are each fields of a pattern. We construct a subgraph for conjunction as per FIG. 12.

Figure 13:
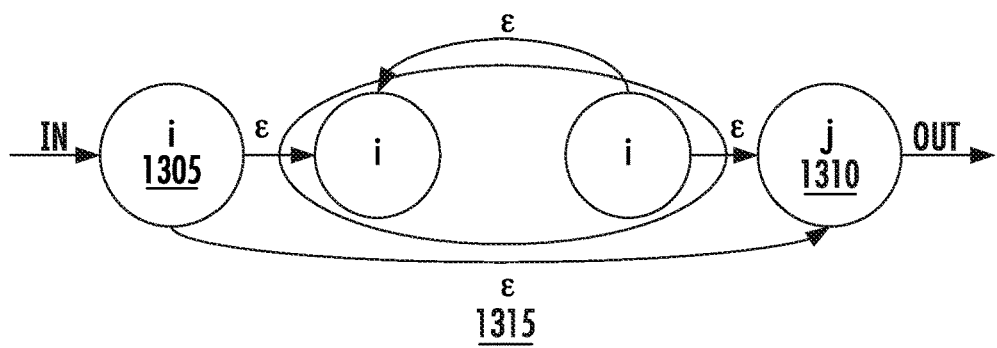
FIG. 13 shows a closure with structures.

The repetition factor of a field is the same as a closure in a regular expression, conventionally written as a+ or a* or a{n:m}. Again, we can represent these closures with structures like those in FIG. 13. In this case, some variation in the subgraph will be necessary based on the value of the repetition set. For example, the forward epsilon 1315 from node i 1305 to node j 1310 is only included if the set includes zero. These variations are largely obvious and continue along with the same basic idea set forth here.

After the intermediate NFA is complete, we reduce it to a DFA, then state-reduce the DFA until a minimal DFA is reached. We then render the DFA as a state-action table, suitable for automation by the usual sort of software or hardware employed in automating state machines. The accepting states of this table mark the entry points to the poly-lambda and the intermediate states provide the collection of data used to bind arguments.

When the DFA is so automated and provided a stream of inputs, it will match a prefix of inputs from the stream and dispatch to the correct overload to handle them, yielding a computed result. If this process is allowed to repeat, the result is a sequence of yielded results, one per match from the input stream. This provides efficient real-time processing of the input data stream by polymorphic functions triggered by corresponding patterns of arguments of various types detected in the data stream.

A method for dispatching execution of polymorphic functions in response to a data stream containing function arguments of multiple kinds, including a mixture of values and type identifiers, includes: (i) Identifying a polymorphic function to be executed, the polymorphic function having a plurality of overloads each associated with a pattern of arguments of different kinds. (ii) Identifying for each overload an output expression to be evaluated over the set of argument values bound from the input stream by matching the argument pattern of the overload. (iii) Translating the argument pattern of each overload into a DFA which will efficiently recognize a match for the pattern in an input stream. (iv) Combining the DFAs of the individual overloads into a single DFA for the polymorphic function as a whole, with the resulting combined DFA capable of matching any pattern that would be matched by the individual DFAs and selecting the overload which should process the matching input. (v) Applying a data stream to the combined DFA, the DFA then examining or consuming data from the stream, or both, as necessary to determine a match or the absence of a match and, in the case of a match, binding the input argument values appropriately and selecting the appropriate output expression to be evaluated. (vi) Dispatching evaluation of the output expression and returning the result.

Given a set of streams of data of distinct types being produced by reactive functions, this invention is a technique to represent those streams such that their outputs may be composed efficiently into a single stream of unified type.

The need to solve this sort of problem arises commonly in all forms of dataflow programming. It is applicable to very large-scale architectures, such as the flow of data within and between enterprise data centers, as well as to very small-scale architectures, such as the flow of events in an embedded device.

This invention is applicable to all domains of dataflow programming; however, it is most suitable in situations where the speed at which a match can be detected and a handler function applied is of utmost importance, and where there are limited storage and computing resources to devote to the execution.

Example

Consider an inflow consisting of a set of n separate input streams, $A_i: 0<k<n$. Each stream consists of a queue of elements of type $T_i$. Each stream is being consumed and transformed by a reactive function, $f_i$, of the type $T_i \rightarrow U_i$, such there is an outflow n streams, $B_i$, each consisting of a queue of elements of type $U_i$. We desire to merge the all streams $B_i$ into a single stream, C, using a merging function, m, of the type $\Sigma\ T_k \rightarrow \Sigma\ U_k$.

Here is an example of such a merge occurring between three streams, written in the Vel language:
B0=f0 from A0
B1=f1 from A1
B2=f2 from A2
C=B0 or B1 or B2

The stream C will consist of values from B0, B1, and B2, interleaved as they are generated. Notice that there is no point to realizing the contents of the B streams, as they are only used to compose the C stream. They could just as easily be represented as anonymous, temporary sub expressions:
C=(f0 from A0) or (f1 from A1) or (f2 from A2)

This invention describes translation of each transformation function fi into a deterministic finite automaton (DFA) and the merge function m as a union of these DFAs into a single, minimal DFA. The result is a maximally efficient means of merging the inflows Ai into the outflow C without having to realize the contents of the intermediate flows Bi.

This technique may be applied repeatedly, conflating subsequent layers of intermediate flows into a single reactive function. This is consistent with the notion of a merge being denoted by an infix or operator in a declarative dataflow language, as is the case in Vel.

This problem is can be solved by brute force; that is, by realizing the intermediate flows and then consuming them, even if the merging function is the only consumer of the intermediate flows.

It is often also the case that the merge function requires its inflows and outflow to all be of the same type, or else of undifferentiated type in the case of typeless systems. This is due to a lack of union types (also called sum types) in their type systems. The presence of a true merge in a dataflow system mandates the use of union types.

Some dataflow systems lack a true merge, instead implementing multi-input-single-output reactive transforms. Although these are useful constructs in their own right, they are not as simple or general as a true merging function and cannot be optimized as completely.

Representing a matching function as a DFA is more efficient than expressing it as an arbitrary expression of Boolean type. The DFAs of multiple matching functions, each with its own driving inflow, are unified to form a single, efficient DFA representing a merge function with a single outflow. The merging of the DFAs may be done such that the result will match as early as possible or as late as possible, resulting in two different, potentially desirable behaviors. Composing multiple reactions into a single DFA results in a minimal machine; that is, an algorithm which performs all the matches using the minimal number of decisions. A minimal machine is most the suitable implementation of multiple reactions for small platforms. A minimal machine has an algorithmic advantage over multiple, separate evaluations of matching expressions and thus, all else being equal, will perform more efficiently.

To merge the set of transformation DFAs into a single DFA, we must consider them as we would alternations in a regular expression. In translating a regular expression, the syntax a|b is an alternation: match a OR match b. In our case, a AND b are each DFAs from transformation functions. We construct a subgraph for their alternation as per FIG. 11.

After the intermediate nondeterministic finite automaton (NFA) is complete, we reduce it to a DFA, then state-reduce the DFA until a minimal DFA is reached. We then render the DFA as a state-action table, suitable for automation by the usual sort of software or hardware employed in automating state machines. The accepting states of this table mark the points at which merged data elements are emitted to the output stream.

When the DFA is so automated and provided a set of input streams, it will transform each input according to the original transformation function associated with that input, and yield all results interleaved together on a single output.

A method for merging multiple, independent streams of input data into a single stream of output data, includes: (i) Identifying a plurality of potential input data streams. (ii) Identifying a plurality of transform functions, one per input stream, which are to be performed on the data in each input stream and the results of which are merged to be together. (iii) Identifying a merging function which receives input data elements from multiple streams simultaneously and interleaves data elements into a single output stream. (iv) Translating each transform function into a DFA which will efficiently perform the transform. (v) Merging the transform DFAs into a single combined DFA which will efficiently perform the transforms and interleave the results into a single stream. (vi) Applying the data streams to the combined DFA, the DFA then performing the work of transformation and merging. (vii) Dispatching the merged output to a destination for use.

This invention includes a tool and associated methods for developing software in the Vel programming language. Vel is a programming language useful for expressing dataflow programs. Correct dataflow programming presents many challenges. Some are challenges common to all forms of computer programming while others are specific to the dataflow paradigm.

This tool addresses many areas of Vel programming, including: (1) Checking for syntactic and semantic correctness. (2) Checking for logical correctness. (3) Debugging assistance. (4) Translation of source code into a secure and portable form (that is, packaged code). (5) Translation of source code or packaged code into a native and optimal binary form suitable for a variety computing platforms, particularly small platforms. (6) Describing packaged code and confirming its signature. (7) Batch-mode interpretation of packaged code. (8) Interactive interpretation of Vel source. (9) Simulation of a dataflow environment in which to run packaged or native code. (10) Remote execution, monitoring, and control of binary code in a live dataflow environment.

These are the tasks which anyone developing software in the Vel language needs to accomplish. This invention provides sufficient support in all these areas to allow a person proficient in Vel programming to produce correct and useful software.

Checking for syntactic and semantic correctness is a task common to many forms of automatic software translation. Tools for checking for logical correctness are usually not incorporated into the translation tool itself. It is common for these sorts of tools to exist separately, often with imperfect insight into the code they are testing.

Although debugging is a common task in software development, most debugging tools focus on imperative-style programming. Debugging of functional and reactive programming is much less commonly addressed as it presents challenges very different from imperative debugging. In particular, it can be difficult to examine computations "in flight" in these languages, as they values often do not have addresses at which the debugger (and debugging programmer) may peek.

The ability to target multiple native platform architectures is not uncommon for compilers of system languages, such as C, but it is not a power to be commonly found among script-level languages. Scripting languages tend not to be compiled, or to be partially compiled or just-in-time compiled (jitted) for their hosts, but cross-compilation (a compiler running on one architecture but generating code for another) is uncommon. Specifically compiling a script-level language for execution on a small platform is extremely uncommon.

An interactive shell is a common feature of scripting languages. Python, for example, implements a shell. A shell which is connected to a dataflow environment, real or simulated, is far less common.

Remote execution of compiled code is a feature of some operating systems and is also available from several third-party tools, both open source and commercial. These tend not to target small platforms specifically, but some examples of remote execution tools for small platforms do exist. They are not specific to dataflow programming and are not incorporated into the tools used to develop the programs to be remotely executed.

A single, integrated tool for developing Vel code is useful and convenient for software developers working in the Vel language. The tool is principally a compiler, translating the Vel language, but it also offers several other sets of functions related to Vel programming. Having the tool perform logical correctness tests along with syntactic and semantic correctness tests helps the developer be more efficient and promotes greater correctness of code. The logic tests have the benefit of the compiler's insight into the code, so diagnostic messages can be more complete. The interactive shell enables the developer to test code and get an immediate response. This is useful for development as well as debugging. The shell also provides the programmer visibility into the dataflow environment.

Generating standalone binary executable code suitable for use on small platforms enables the Internet-of-Things use case, which often relies on performing complex computation on a variety of small devices. Providing a simulated dataflow environment helps developers work out bugs in their code and, in cooperation with tests for logical correctness, demonstrates that a package is working correctly. Remote execution of a compiled package, particularly when the remote platform is small, allows a programmer to iterate quickly on his program, compiling and testing the program on its target hardware in a single command, even if the target platform is not the one on which he is developing.

The process of translating a language from its lexical representation to an intermediate, symbolic representation (phase-1 compilation), and then transforming this intermediate representation into a form which may be executed by computing hardware (phase-2 compilation).

The Vel phase-1 translation tool follows the general strategy common to compilers, specifically: (1) Analyzing the input string to break it into a sequence of tokens. (2) Analyzing the sequence of tokens to form a syntax tree. (3) Identifying symbolic declarations within the tree. (4) Identifying and resolving symbolic references within the tree. (5) Early optimizations, such as common subexpression elimination and constant folding. (6) Type-checking. (7) Additional phases of optimizations and symbol maturation. (8) Finalization of symbols and emission of intermediate representation.

One of the distinguishing features of the Vel phase-1 translator is its use of deterministic finite automata or DFAs to perform the pattern-matching required for function application and to trigger reactions. The phase-1 translation tool includes: (1) A syntax analyzer transforming the input language to a syntax tree. (2) A lexical binding component which permits the program under translation to make self-reference, such that the language under analysis can be modified by the analyzer, in the manner of a DSL or macro-analyzer. (3) A semantic analysis algorithm translating the bound syntax tree into symbols representative of data flows, patterns, reactions, functional expressions, timers, and input/output parameterizations. (4) An expression translator which transforms expression trees into stacks suitable for more or less direct translation into microprocessor ALU instructions. (5) A DFA generator for translating the patterns and expressions of reactions into an intermediate collection of potentially nonminimal DFAs. (6) And a DFA combining and reducing algorithm for producing unified, minimal DFAs from the intermediate collection of DFA.

The output of the phase-1 translation tool includes: (1) The logical identities of each of the streams involved in the translation, such that each may be a unique referent among the plurality of streams. (2) A description of the flow in the data in each stream, each being inward (toward the reactions; that is, a subscription to an external source), outward (away from the reactions; that is, a publication to an external destination), both inward and outward (a publication/subscription pair), or internal (used only as intermediate steps in other reactions and therefore not surfaced as publications or subscriptions). (3) A description of the type of data flowing in each stream, each time being described in finite terms such that data being injected into or extracted from a stream may be statically checked for type correctness. (4) A set of tables describing the states and transitions of the DFAs. (5) A set of expression stacks describing the calculations which are to be performed during reactions. (6) A table mapping stream inputs to DFA inputs. (7) A table mapping timed events to DFA inputs. (8) A table mapping DFA outputs to action pairs, each pair consisting of a reference to an expression stack and a stream output, indicating that the output of the DFA is to be transformed by the given expression then pushed to the given stream.

The Vel interpreter and dataflow simulator use the output of phase-1 translation directly. The interpreter emulates a hardware platform in the execution of the code and the dataflow simulator emulates a streaming data environment, providing inputs to and collecting outputs from Vel streams. Let us call these two tasks instruction interpretation and dataflow emulation.

Instruction interpretation is a category of task well understood by computer programmers who specialize in writing compilers and interpreters. The task includes constructing an execution context in which the states of runtime variables may be stored, and then stepping through the instructions of the program one at a time, accessing data from the execution context and updating it as needed.

In the case of Vel, the execution context must also include a set of queues to hold streams of data in the process of transformation and a table-driven state machine engine to execute the transformations described by the DFAs. The queues arise due to declarations in the Vel source which describe flowing channels of data. Some of these are external inputs or outputs of the Vel program while others are purely internal channels describing intermediate states between input and output.

Dataflow emulation consists of providing access to external sources and sinks for data, such as files or sockets, and the programming necessary to exchange data between these external systems and the Vel program under interpretation. This will include injector functions, which read data from external sources and push them to the queues representing the program's inputs, and extractor functions, which pop data from the queues representing the programs outputs and write them to the external sinks.

Where Vel interpretation according to the invention differs from the norm is in the way the DFAs become involved. The state machine engines read data from the queues and use them to advance the states of their DFAs. The DFA tables include a column of side-effects which are executed when the DFAs move through their states. These side-effects invoke instruction interpretation to perform computation, the results of which are pushed to other queues and this trigger other DFAs.

In this way, a Vel program under interpretation according to the invention is firstly represented by a set of state machines—which are fast and small—and only drop back to general instruction interpretation when necessary. This allows the program to execute with greater efficiency than if it were all to be handled by instruction interpretation alone.

The Vel phase-2 translation tool is, for the most part, not specific to the Vel language but rather to the platform being targeted for execution. The Vel-language-related components of the phase-2 translator are: (1) Initial intake of the intermediate representation produced by phase-1. (2) Overall organization of the phase-2 code generation to produce a reactive system. (3) Provision of a library of runtime support components, such as those that perform external encoding and decoding of data formats or the internal regulation of real-time clocks.

A tool for creating programs for real-time processing of data streams in a multi-source, multi-destination data flow environment, includes: (1) Identifying a plurality of potential data streams. (2) Identifying a set of reactive functions and parameters corresponding to patterns of data in the streams. (3) Identifying a set of handling functions and parameters for transforming data matching declared patterns. (4) Identifying a set of timed events against which patterns of data flow are compared, such as intervals of time in which data are to be collected or discarded or specific points in time before or after which data are to be collected or discarded. (5) Creating a dataflow program describing the identified streams, reactions, functions, and timed events. (6) Providing the program as input to a two-phase translation tool comprising a phase-1 translation tool incorporating a DFA generator for translating Vel program statements to corresponding DFAs and a phase-2 translation tool for generating platform-specific hardware instructions corresponding to the translated Vel statements for execution on the platform. (7) Receiving the output of each phase of the translation tool.

The output of the phase-1 translation tool may be used by the interpreter component, includes: (1) An instruction interpreter which emulates a hardware platform in the execution of the code. (2) A data flow simulator which emulates a streaming data environment, providing inputs to and collecting outputs from Vel streams.

The output of the phase-1 translation tool may be used as the input to the phase-2 translation tool, includes: (1) A hardware instruction generator which translates instructions from the intermediate representation to a form suitable for execution by the target hardware platform. (2) A program organization module, which directs the generation of the output into a form suitable for use in a reactive program in a dataflow environment. (3) Libraries of runtime support components necessary for execution. The output of the phase-2 translation tool is an executable program suitable for use on the targeted hardware platform.

A single, integrated tool for developing Vel code is useful and convenient for software developers working in the Vel language. The tool executes on a host platform, consisting of a standard computer and operating system, such as an Intel x86 architecture microcomputer running the Linux operating system. The tool may interact with other tools and facilities of the platform, such as a web browser or integrated development environment (IDE). If the platform has a network interface device, the tool may also access remotely hosted resources. If the host permits access to the Internet, the tool may also access Internet-based resources.

The tool is principally a compiler, translating the Vel language, but it also offers several other sets of functions related to Vel programming, including: (1) A driver for testing logical correctness, to verify, demonstrate, and document the correct operation of Vel programs. (2) An interactive shell for language interpretation, to facilitate rapid iteration in Vel program development and to help demonstrate the operation of Vel programs. (3) An interactive program debugger, to facilitate the investigation and correction of malfunctions in Vel programs.

Vel interaction shell and debugger. Even though the debugging is common in software development activities and numerous tools exist these tools only let you debug in an imperative step-wise in style. The burden of the sense of logic flow and semantics still lies with the human using the tool. Interactive shells are common as well for various programming languages but what a technique of this invention provides is a significant improvement by providing very unique semantic-level debugging capabilities. This helps a Vel programmer focus exclusively on the business logic or semantic-based debugging, or both; significantly expediting the problem solving process.

Live debugging and inspecting or monitoring of running Vel programs: The tool also improves upon the concept of being able to debug or monitor live running Vel programs. Typically for monitoring or inspecting running processes or programs, or both, extra instrumentation or external tools are needed. In the context of an Industrial IoT environment this problem becomes excruciatingly worse with hundred of thousands of sensor data points that needs to be inspected against desired outcome. This make the management and debugging to dataflow related problems almost intractable at scale. The tool solves the problem by exposing default internal self-inspection data-flow regime which can be externally queried at any time to quickly fetch the semantics of data flow and what is going on in the moment; in-flight. In simple words: when a program does not behave as expected or does not produce data as expected; one could just query the program to ask why it did not work and it just tells you. For real-time streaming data analysis this is significant improvement since a lot of program debugging needs to be done with data in-flight; in the moment.

Example

In this section we provide a simple concrete example of the tool in action. We start with a concrete use-case and a Vel program for it. Then we step into using the tool to demonstrate the capabilities described above. Consider a sensor input stream for a valve. The valve that opens and closes as conditions change. When the valve is open sensor reading is: "true" and then the valve closed the sensor reading is "false."

The input_stream is a record with two fields in it:
(Integer) timestamp
(Boolean) is_open The goal is to detect when exactly the valve opened and send a true to an output stream. So in terms of sensor readings we detected a false followed by a true. An important pattern matching stream processing feature involved here is: Valve close-to-open transition detection via a sliding window pattern using TFR (1).

Sample JSON formatted real data coming in from input stream data:
Valve
{"timestamp":1473223600, "is_open": false}
{"timestamp":1473224302, "is_open": false}
{"timestamp":1473224402, "is_open": true} . . . so on forever Vel Program:
sensor_data is {is_open is bool, timestamp is int} # sensor data_type definition
1. Input Stream Definition
def stream valve_status is sensor_data
2. Valve Open Event Detection Windowing Pattern Declaration. We create a window of size 2 that slides 1 at a time on incoming streaming data
open_event is (item1:sensor_data, peek, item2:sensor_data->
item1.is_open==false and item2.is_open==true)
3. Pattern application directly on incoming stream to get desired output result def stream valve_opened=true select event from (open_event from valve_status) when event==true Verifying and testing logical correctness. FIG. 14 shows a screen of verifying and testing logical correctness. Although this is a small concrete example to demonstrate program correctness coupled with logical verification (flow of meaning). One could extrapolate this to fairly complex data-flow problem. In which the ability of the tool to detect the syntax incorrectness and also logic (semantic) incorrectness is very useful.

Interactive shell and live debugging: The Vel development tool provides an interactive debugger that runs in a terminal. This tool is useful during development of Vel scripts, to confirm that they are operating as expected or to figure out what's wrong with them.

Entering and exiting the debugger: The same tool which compiles Vel also serves as its debugger. FIG. 15 shows a command debugger. The command is "debug." This drops you into an interactive session in your terminal. You can tell when you are in the Vel debugger because you will see a "vel>" prompt. To exit the debugger, press ctrl+d or quit.

Loading: Before you can work with a package, you must load it. The LOAD directive reads a script from a file, translates it, and holds it as a package in the debugger, ready to run.

FIG. 16 shows an example of a load directive. This loads the "test.vel" script and assigns it the logical name "valve_test." We will use the name "valve_test" from now on when we want to refer to this package. The package has not yet started, however. An unstarted package cannot react to inputs and won't produce any outputs. You may load as many packages as you like. When they are running, they will run in parallel and communicate with each other over topics, just as they would in a live edge node.

FIG. 17 shows a status and manifest directive. You can see which packages are loaded with the STATUS directive and you can see the streams of each package with the MANIFEST directive.

Starting Up. Use the STARTUP directive to start all your packages running. You can also startup an individual package by specifying its name, but it's often useful to start them all at once. If a package that has startup actions will execute them as soon as it starts. Once it has started, the package may react to incoming data and produce results according to its stream definitions. You may change the bindings of a started package without stopping it or unloading it.

Data Injection. The INJECT directive allows you to inject data directly into a stream without binding it to an external source. This bypasses the need to have additional infrastructure or tools setup to pump data experiment. For example: In this example we have been discussing we will first pump that the status of the valve is currently not open. So we are telling the program artificially that the valve is currently not_open.

FIG. 18 shows a valve currently not open. The value being injected is given in Vel script, not as a quoted string, and it is not subject to any form of transcoding. You are constructing a Vel value directly and stuffing it into the stream. After injection, the value behaves normally. Reactions and other computations based on it will proceed just as though the value had been received from the broker. Direct injection is convenient when you just want to try running some values through a package. The package must be started before you can inject to it.

Deadlines. One of the key features of the tool is: Time in the debugger is artificial. It only flows when you tell it to, allowing you to step packages forward and see how they behave. The time at which the debugger starts is called "start" and the debugger's current time is called "now." All other times are given relative to these. There are no absolute times. Each package has a future time in mind when it would next like to act. This is the deadline of the package. You can see the deadline of each package with the DEADLINE directive:

FIG. 19 shows a deadline directive. A deadline of "never" means there is no deadline. In this case, the "valve_test" package has no deadline meaning the package is purely reactive (that is, it does not take action based on its own timers) and currently has no pending inputs, so it doesn't care if it ever runs again. Remember, the use-case was to determine if the valve_status is a false followed by a true. The "next" line at the end tells you the soonest deadline among all the packages. In this case, as there is only one loaded package, the next deadline is the same as the deadline for "valve_test," which is "never." A package with a deadline of "now" is ready to run immediately. A package with pending inputs is always ready "now," is it wants to process those inputs. If a package has running timers, it may have a deadline based on them. Such a deadline might be something like "now+25 (ms)."

FIG. 20 shows a valve to be open. Now to exercise the logic of the program we will inject the valve_status to be true; the valve to be open. Injecting a true here would indicate that the pattern that is waiting for the data to match a false followed by a true windows would. The pattern match satisfies the condition for the reaction to happens which means if our assumed logic is correct we should see an output on the valve_opened. This is the most accurate detection of a logical event from raw sensor data.

FIG. 21 shows a GO directive. Making it go. The GO directive causes the debugger to run forward to the soonest deadline. The debugger has allowed the "valve_test" package to react to its pending input now by using go. This didn't require any time to pass, as the input was already waiting. The pattern was indeed matched and we now have an output for it.

valve_test.valve_opened see the value true our intended goal.

Automated Debugging. It is often convenient to run the debugger through a preset series of directives. To facilitate this, the debugger provides the DO directive: vel>do "stored_directives.vdbg."

This will read the directives stored in the file "stored_directives.vdbg" and execute them one at a time, in order. It's the same as if you had typed them into the debugger, but without all the typing.

Replaying capture live data into the debugger. In debugging live scenario is it often convenient to capture "live" data from the existing data source and replay it into the Vel debugger. That way you can control execution like a video editor and semantic debug with data in-flight. The external injection of the notion of time helps inspect any part of the system.

Live inspect of already running Vel programs in production: This is the part of the tool that helps to extract live state of a running Vel programs in production. Circling back to the point made earlier the tool solves the problem but exposing default internal self-inspection data-flow regime which can be externally queried at any time to quickly fetch the semantics of data flow and what is going on in the moment; in-flight.

Example Usage:

$ vel dump_graph<name_of_a_running_program>

This dumps both the state and shape of the data flow. The output of this can be then plotted continuously in the visualization studio (described below) that details out the value of seeing the flow visually. FIGS. 22A-22B shows state and shape of data flow. In FIG. 22A, a line 2205 is longer than can be viewed in the portion of the screen shown in the figure. The remaining portion of line 2205 is shown as line 2207 in FIG. 22B.

Other sets of functions related to Vel programming include: (4) A platform-independent, cryptographically secure program packager, to allow a Vel program to be translated into an obfuscated, executable, platform-independent form (a package) that contains the program definitions as well as information about the program's origination (such as the program's version, the author's name and contact information, the intended license for use of the program, relevant legal notices, and other such meta-information), along with a cryptographic digest of the package and a digital signature to verify its contents, to facilitate and standardize the process of releasing (possibly multiple versions of) developed Vel programs for use by others while providing a reliable means of verifying the program's origin and internal integrity;

5. A cryptographically secure program package importing facility, to facilitate and standardize the process of importing (possibly multiple version of) Vel programs developed by others while providing a reliable means of verifying the program's origin and internal integrity.

6. A cryptographically secure program package inspection facility, to allow a developed package to be inspected reliably for its contents, including its authorship, version, and other meta-information, its programmatic definitions, and its internal help and documentation, and to verify the package's cryptographic security, and to render information about the package into forms (such as JSON and HTML) useful and friendly to external automation and direct human consumption.

7. A package interpreter, to allow a packaged Vel program to be executed on the host platform without full compilation to the host's native architecture, and which provides to the running program a variety of supporting abilities, such as the ability to subscribe to or publish to streaming data channels according to certain standards and protocols, the ability to encode or decode data according to certain standards and protocols, the ability to compress or decompress data according to certain standards and protocols, and the ability to encrypt or decrypt data according to certain standards and protocols.

8. A cross-platform executable code generator, to translate Vel programs or packages, or both, into compact, efficient forms that can execute natively on a variety of platforms, including the host platform, and to include in the executables various components of reusable (library) executable code as may be necessary or convenient to fulfill the useful operation of the program, such as components to enabling subscripting to and publishing to streaming data channels according to certain standards and protocols, components to enable the encoding and decoding of data according to certain standards and protocols, to compress or decompress data according to certain standards and protocols, to encrypt or decrypt data according to certain standards and protocols.

9. A remote deployment and maintenance facility, to allow developed Vel programs to be transmitted to and installed on remote hosts in a secure and verifiable manner, to allow programs thus installed to be upgraded when new versions become available, to allow programs thus installed to be removed from the remote host when no longer needed, to allow programs thus installed to be started running on the remote host, to allow such programs running on a remote host to be monitored for correctness, performance, and normal course of operation, and to allow such programs running on a remote host to be stopped from running.

10. A dataflow simulation studio, to provide a realistic dataflow environment in which to develop, verify, and demonstrate Vel programs, including the ability to subscribe to and publish to streaming data channels, to record the live contents of streams, to create simulated streams, to edit the contents of recorded or simulated streams, to play back recorded or simulated streams, to pause or stop the playback of recorded or simulated streams, and to rewind or repeat, or both, in whole or in part the playback of recorded or simulated streams.

11. A program visualization studio, to allow a Vel program to be displayed or revised, or both, or authored in a graphical fashion, wherein Vel program components are represented graphically as nodes and the data links between components are represented graphically as edges, thus assisting a user to gain a more intuitive and thorough understanding of the action of the Vel program.

12. A dataflow visualization studio, to allow, in concert with the program visualization studio, dataflow environment studio, and any relevant and accessible live data streams, the animated, graphical display of streaming data flowing through a Vel program, thus allowing the user to see how data enters, is transformed by, and leaves program components, to see changes in the program's internal state as a result of the flow of data, to monitor the program's correctness, performance, and normal course of operation, and to assist in the detection, diagnosis, and correction of any erroneous operation.

Program or dataflow visualization and simulation studio: The program or dataflow visualization and simulation tool is a Web-based that uses the Vel tool in the backend for it various services already described above in the patent.

Figure 23:
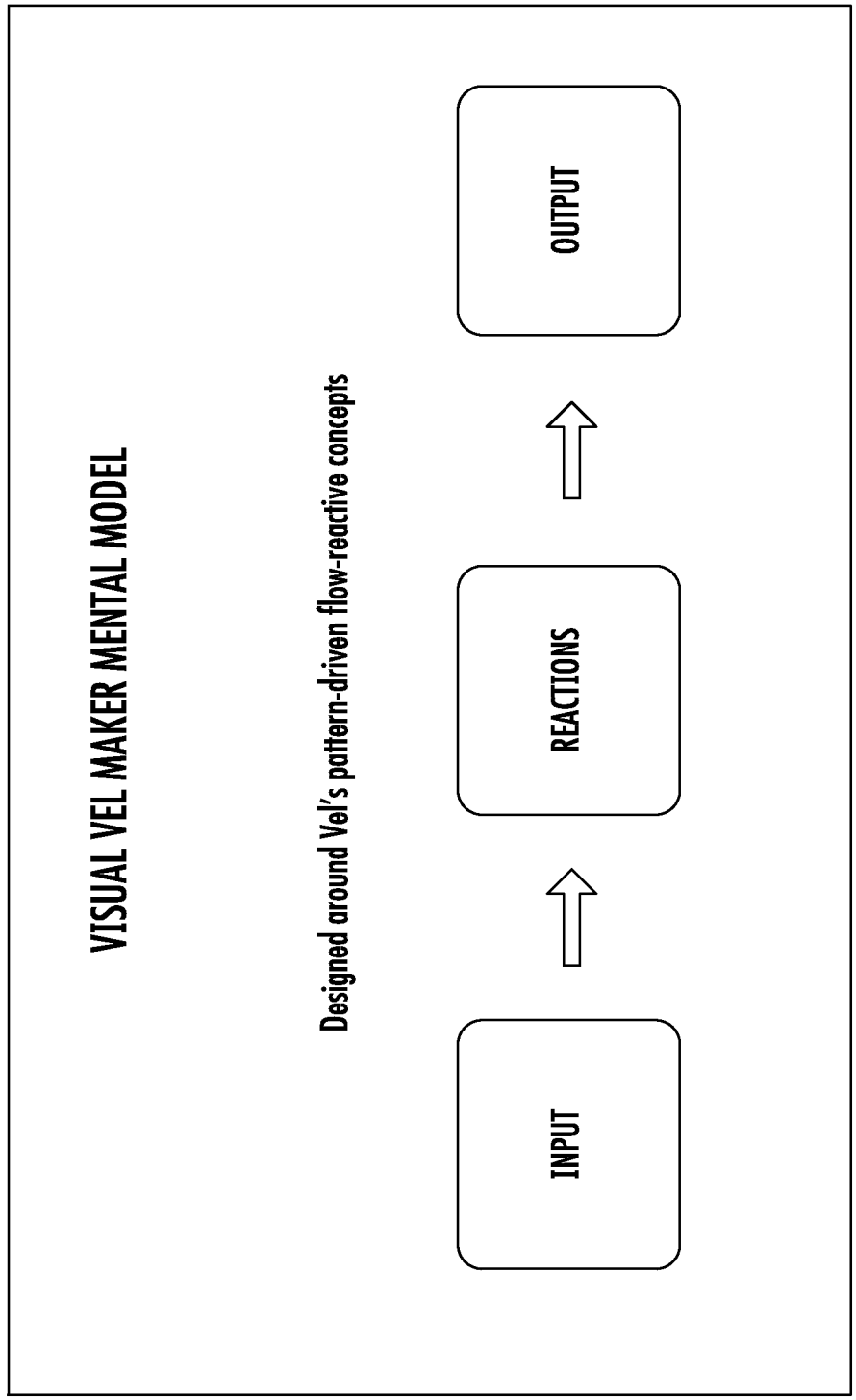
FIG. 23 shows a block diagram of pattern-driven flow-reactive concepts for a visualization studio development environment for dataflow programming.

FIG. 23 shows a block diagram of a visualization studio's pattern-driven flow-reactive concepts. The visualization studio is a development environment for a dataflow programming language. In a specific implementation, the development environment is for the Vel dataflow programming language and is known as "Visual Vel Maker." The dataflow programming language has three overall components—inputs, reactions, and output—that are designed around Vel's pattern-driven flow-reactive concepts.

Figure 24:
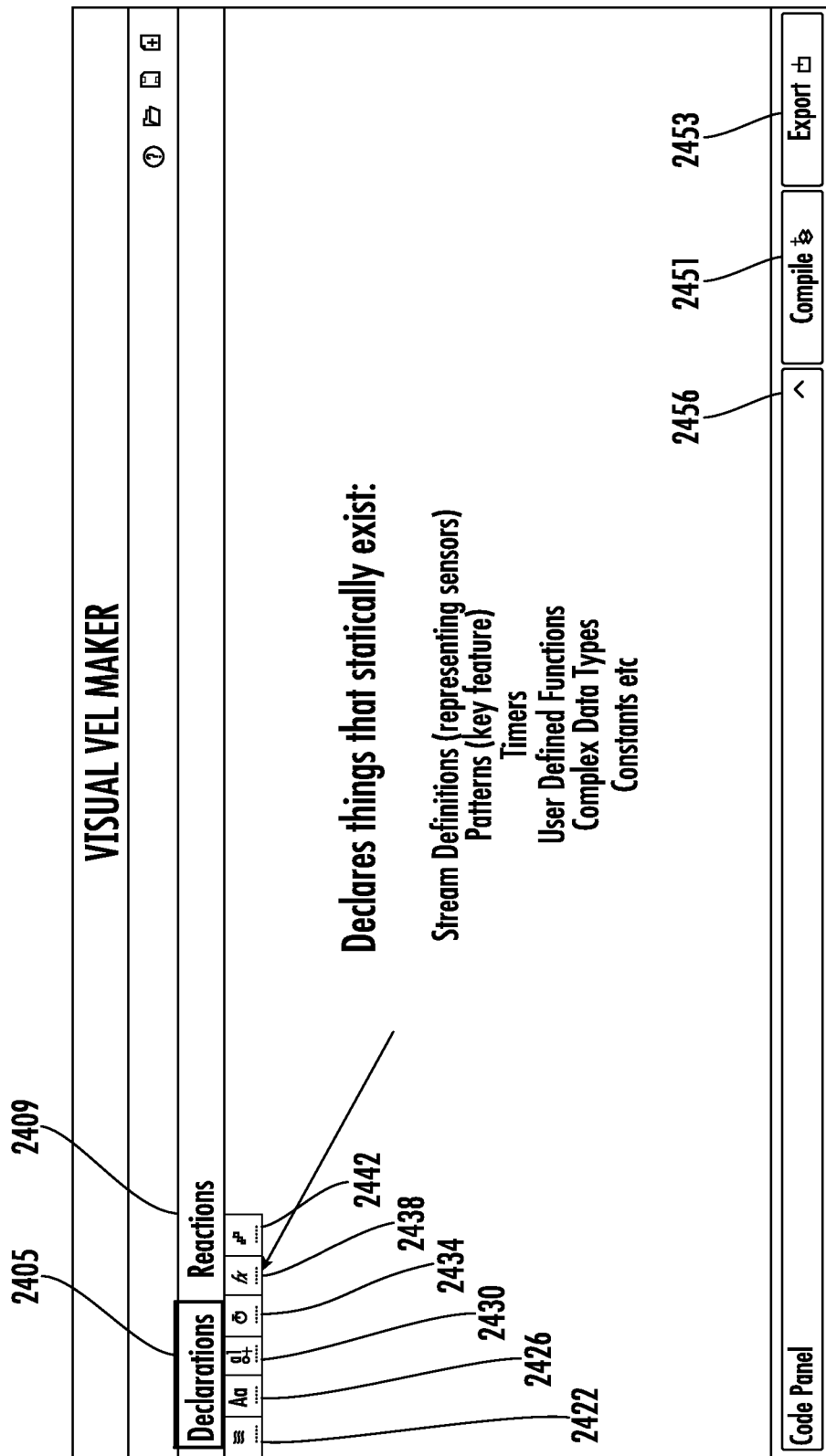
FIG. 24 shows a screen of a declarations page of the development environment.

FIG. 24 shows a screen of visualization studio's declarations page. The dataflow development environment has a declarations page 2405 where the user can declares things that statically exist. There is reactions button 2409 which a user can select to change to a reactions page which is discussed below.

On the declaration page, some examples of declarations include stream definitions (e.g., representing sensors), patterns (e.g., declaring pattern or patterns to match, specifying TFR(1)), timers, user-defined functions, complex data types, and so forth. There is tool bar an icon and button for each of the definition types, stream 2422, constants 2426, user-defined types 2430, timer 2434, user-defined functions 2438, and patterns 2442.

There is a compile button 2451, which the user can select and use to compile a program into a portable package representation, which can be executed outside the development environment. There is an export button 2453, which the user can use export a program into another format. There is a code panel button 2456, which the user can use to open a code panel view of a program. In the code panel, there is a textual view of the program. The code panel can have editing capabilities of a text editor, so that a user can edit the code. This may be helpful for an advanced user who wants to code directly.

Figure 25:
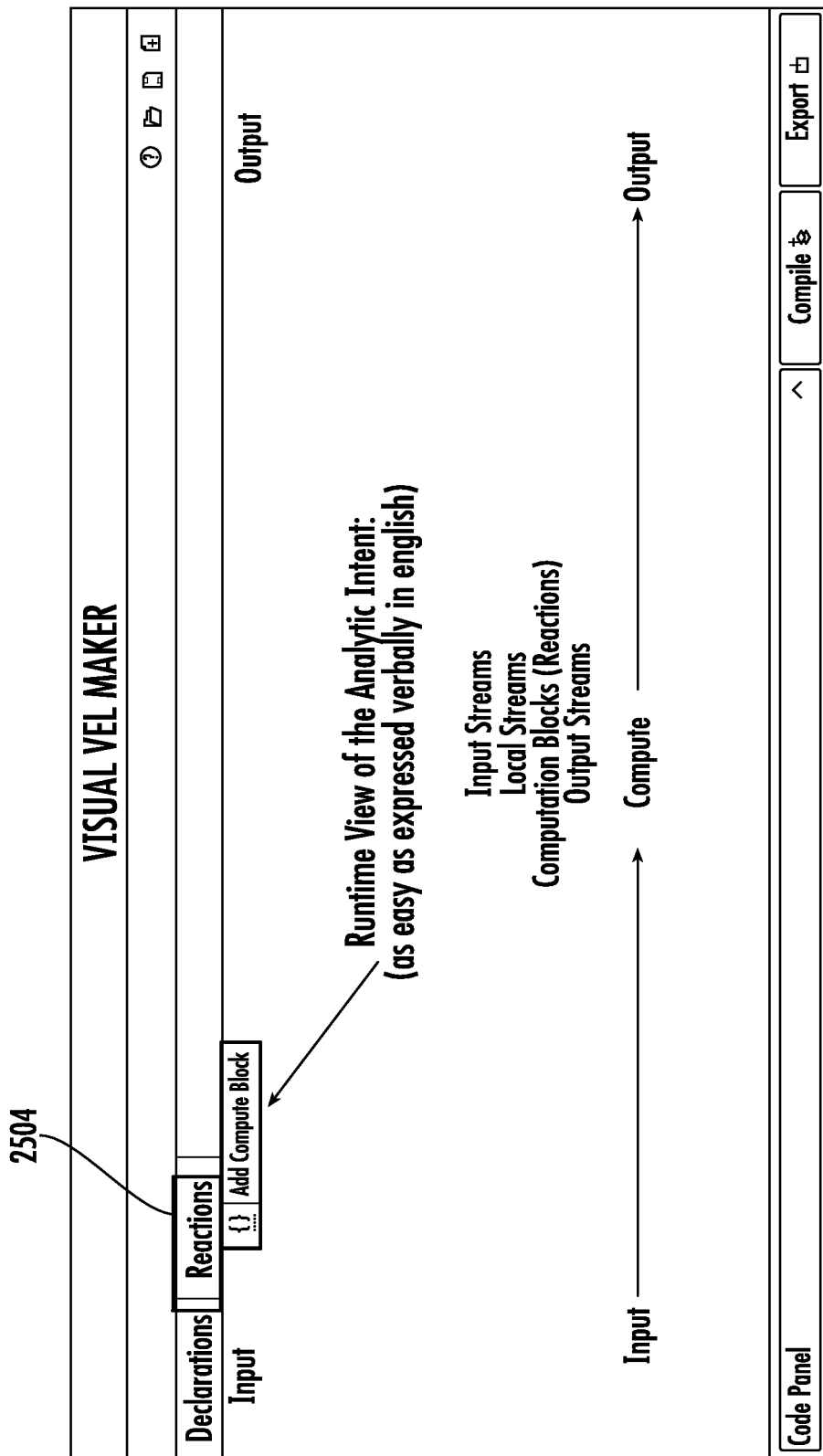
FIG. 25 shows a screen of a visualization studio's reactions page.

FIG. 25 shows a screen of visualization studio's reactions page 2504. In the reactions page, the user will have a run-time view of the analytic intent of the dataflow program. The user can add compute blocks (which can be referred to as transducers). The page can also show the inputs (which can be referred to as injectors) and outputs (which can be referred to as extractors), such as input streams, local streams, and output streams.

Figure 26:
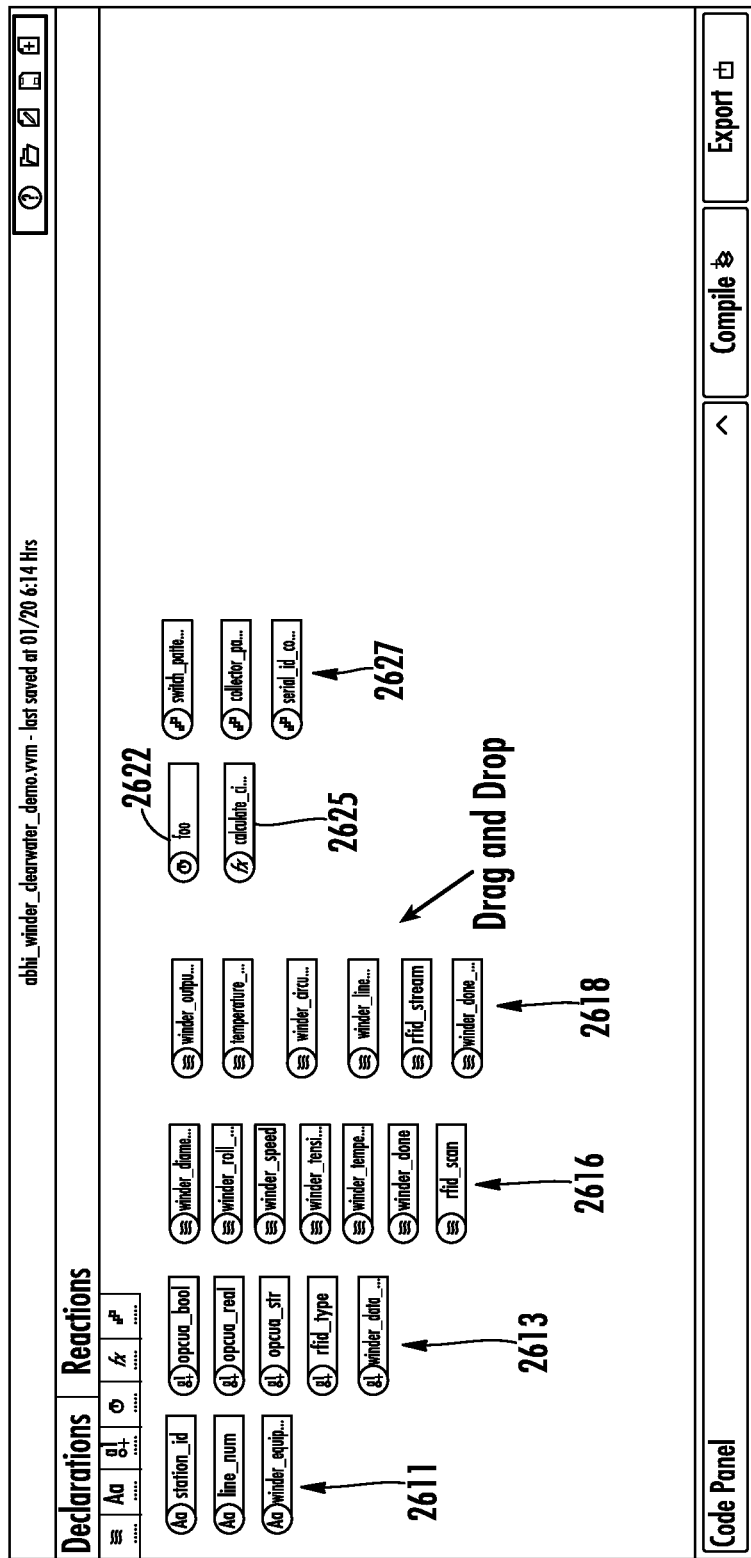
FIG. 26 shows another screen a declarations page where a user can drag and drop blocks into position on the screen to construct a dataflow program.

FIG. 26 shows another screen of the visualization studio's declarations page. This screen is representative of how a user can use drag-and-drop to move the declarations into different positions on the screen, in order to construct a desired dataflow program. The screen shows blocks for constants 2611, user-defined types 2613, streams 2616 and 2618 (presented in two columns), a timer 2422, a user-defined function 2425, and patterns 2627.

Figure 27:
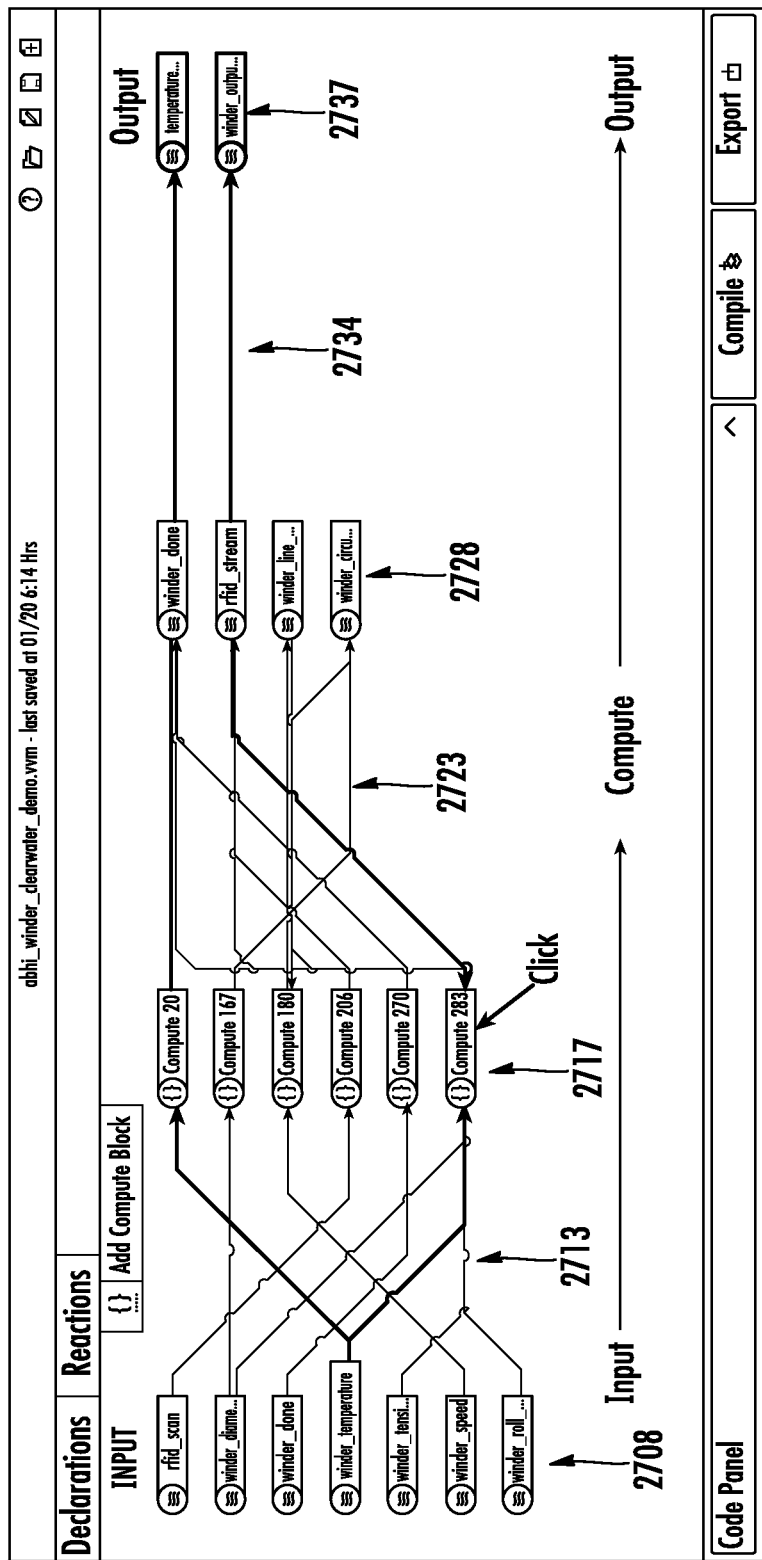
FIG. 27 shows a screen of specifying of a dataflow program in a reactions page.

FIG. 27 shows a screen of visualization studio's reactions page and how a user can specify a dataflow program. There are inputs (e.g., injectors), compute blocks (e.g., transducers), and outputs (e.g., extractors). The user specifies the dataflow program by specifying the declarations (blocks defined on the declarations page), interconnections, compute block (e.g., matcher program, such as TFR(1) specification), and outputs.

As an example, in a particular program depicted in the figure, some streams 2708 (which can be software or hardware sensor devices) are used as input. The user specifies an interconnection 2713 (e.g., blocks shown with line connections) of the inputs to some compute blocks 2717. Outputs of the compute blocks are connected via interconnections 2723 (which the user specifies) to some stream blocks 2728 (e.g., intermediate transducers). The stream blocks are connected via interconnections 2734 to stream outputs 2737 (e.g., extractors).

This example shows how some components or blocks in the system can be used for various purposes, such as a stream block being used as a transducer and an extractor. Further, the user can click on a block on the screen and another window or screen will pop-up that will show the internals of the block. For example, by clicking on a compute block, the internals of the compute block will be shown on the screen.

Figure 28:
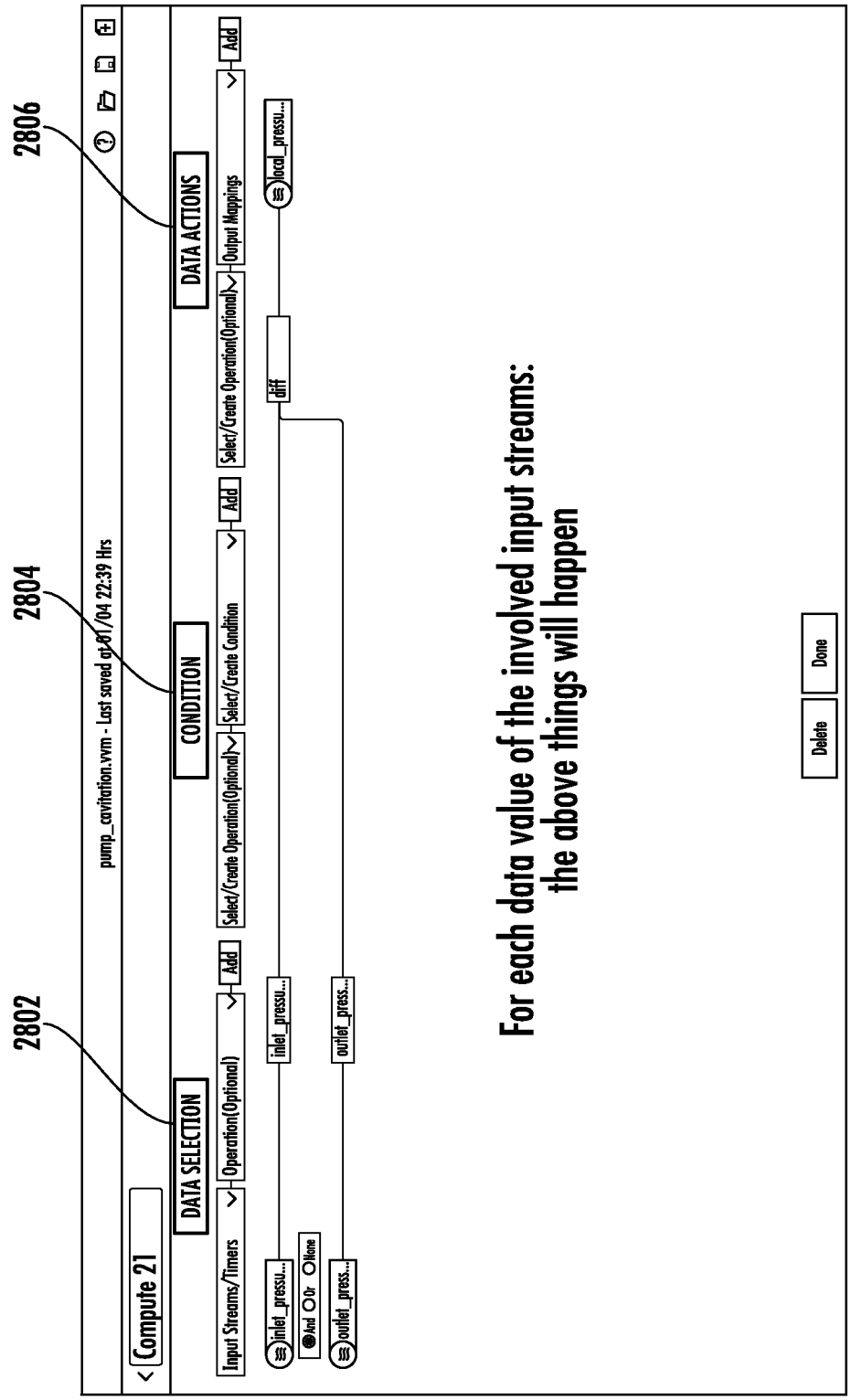
FIG. 28 shows a screen of details or internals of a compute block, which the user can modify.

FIG. 28 shows a screen of showing details or internals of a compute block. This screen may be used to view, specify, or revise the specifications or contents of a compute block. There is a data selection section 2802, condition section 2804, and data actions section 2085. For each data value of the involved inputs streams, the things as specified on this screen will happen in the compute block.

Figure 29:
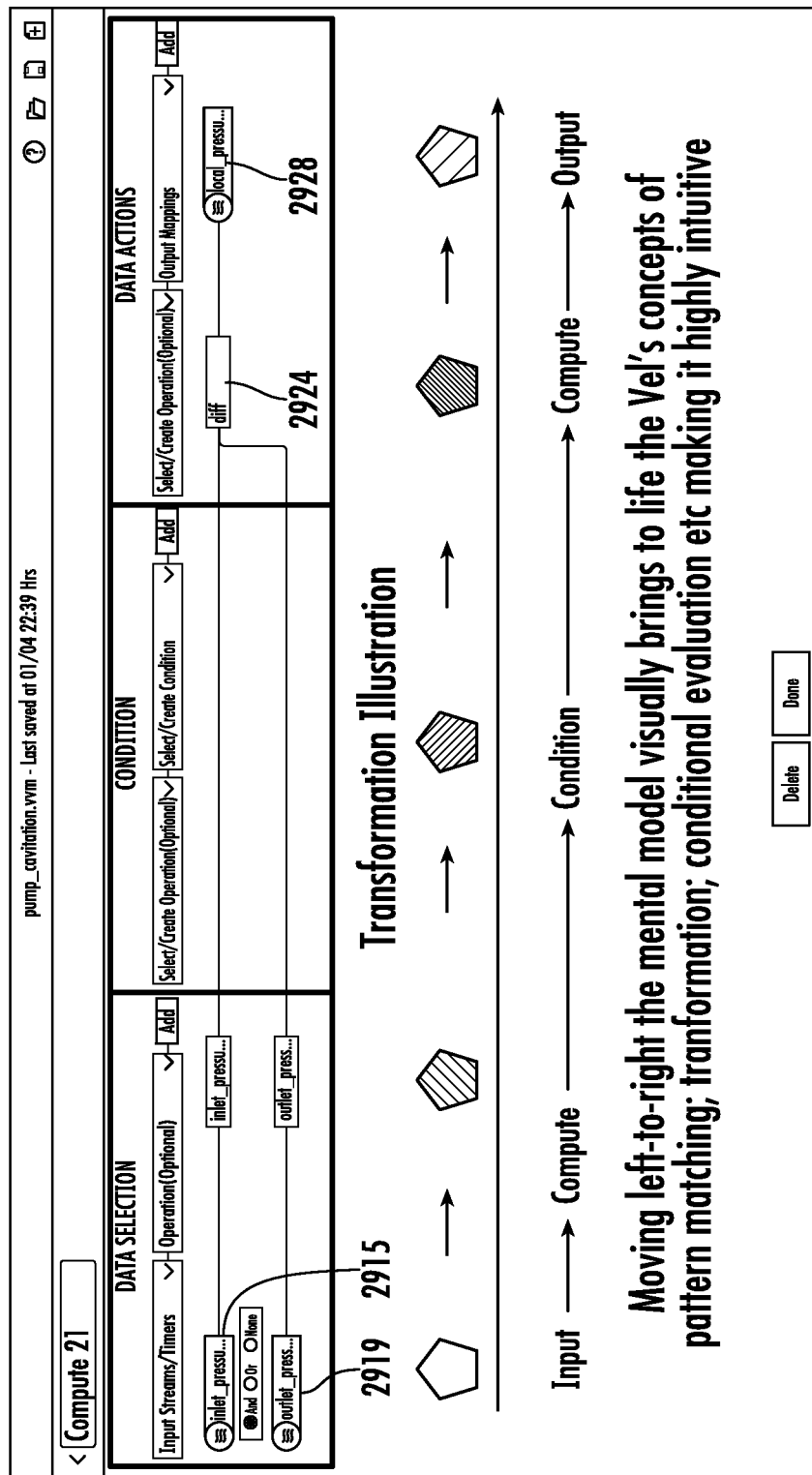
FIG. 29 shows a screen of details of a compute block with annotations.

FIG. 29 shows the screen of the compute block with additional annotations. From left-to-right, the compute block transforms data by input, compute, condition, compute, and output. The model visually implements the dataflow program's pattern matching, transformation, conditional evaluation, and so forth. The environment is intuitive for the user.

In the example depicted, there are streams for an inlet pressure 2915 and outlet pressure 2919. These streams provide inlet and outlet pressure values. These values are connected to a diff block 2924, which performs a difference operation. Then, an output of the diff block is a difference between the inlet and outlet pressure values. This difference output is connected to a local pressure stream output 2928. This compute block can be used as a transducer to provide a virtual sensor streaming local pressure based on two sensor inputs.

Figure 30:
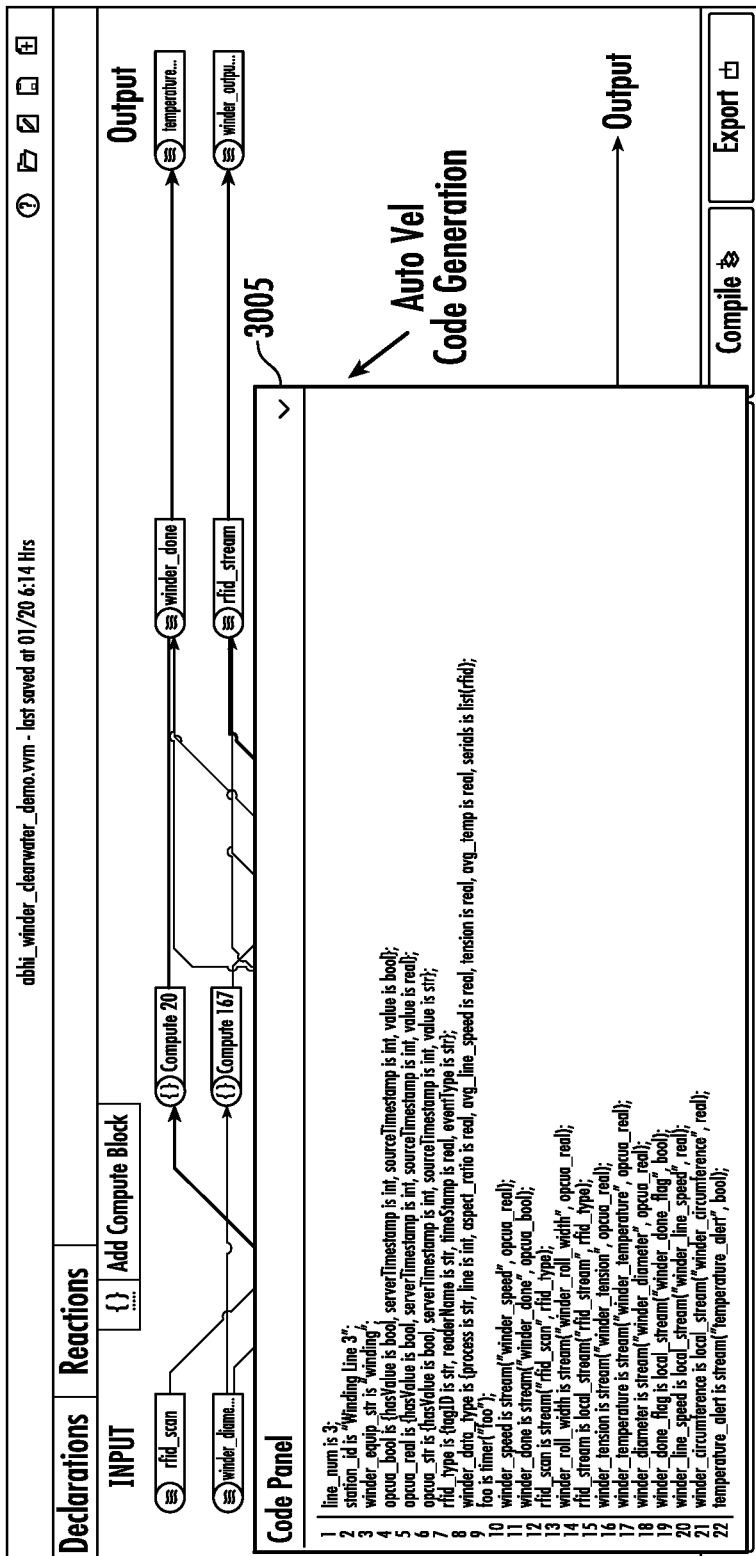
FIG. 30 shows a screen of showing a code panel with computer source code that has been automatically generated by the development platform.

FIG. 30 shows a screen showing a code panel. After the user specifies the details of the compute block graphically, the development environment can generate the computer code for the compute block. The user can open a code panel 3005 to see a textual view of the code for the compute block program in a pop-up window that overlays the reactions screen.

In the code panel, the user can view the code, and as desired, the user can edit the code. Advanced users may prefer to specify some portions of the compute block by coding instead of or in combination with the graphical interface.

In an implementation, the development environment is Web based, where the software executes in a Web browser. In another implementation, the development environment is desktop software executes in an operating system, without the need for a Web browser.

Having the tool perform logical correctness tests along with syntactic and semantic correctness tests helps the developer be more efficient and promotes greater correctness of code. The logic tests have the benefit of the compiler's insight into the code, so diagnostic messages can be more complete.

The interactive shell and debugging facilities enable the developer to test code and get an immediate response and to inspect code director to confirm its correctness or diagnose its error. These are vital activities during program development.

The generation, inspection, interpretation, and sharing of packaged Vel programs (which may be referred to as packages) greatly assists in program development by facilitating a practice of code reuse. A package, once developed and tested, becomes a reliable building block for further development. The package also becomes the common form in which software developers distribute their Vel-based products to users without needing to worry about each user's specific platforms. The user's confidence in and ability to exploit such packages increases because the user is free to inspect the package and verify its integrity without help from the original author.

Generating stand-alone binary executable code suitable for use on a variety of platforms, especially on platforms, enables the Internet-of-Things (IoT) use case, which often relies on performing complex computation on a variety of small devices. The reuse of existing packages on new hardware by cross-compilation enables a heterogeneous and flexible IoT environment.

The remote deployment and monitoring facilities are also vital for the IoT use case. Once developed, a package can be deployed easily to a far-flung and heterogeneous fleet of remote hosts, yet still run optimally on each host by virtue of having been cross-compiled especially for it. The activity of a deployed across the fleet package can be monitored and controlled from a central point, simplifying operations.

Remote execution of a compiled package, particularly when the remote platform is too small to provide a convenient development environment, also allows a programmer to iterate quickly on his program, compiling and testing the program on its target hardware in a single command, while maintaining the convenience of developing on the platform of his or her choice.

Providing a simulated dataflow environment helps developers work out bugs in their code and, in cooperation with tests for logical correctness, demonstrates that a package is working correctly. Dataflow simulation is also useful in educational settings, to assist in sales demonstrations, and in other situations where live data is not available or desirable.

Likewise, program and dataflow visualization greatly assist in the process of software development. The programmer can work intuitively with the program and dataflow environment, navigating more swiftly between components than is generally possible with text-based development alone, and inspecting and modifying active program components and the data being acted upon in situ.

One of the distinguishing features of the Vel phase-1 translator is its use of the TFR(1) algorithm to construct efficient state machines ("matchers") to perform the pattern-matching required to trigger reactions and apply attribute computation functions. A specific pattern-matching technique is called timed forward right-most (1) pattern matching or TFR(1).

The phase-1 translation tool includes: (1) A syntax analyzer transforming the input language to a syntax tree. (2) A lexical binding component which permits the program under translation to make self-reference, such that the language under analysis can be modified by the analyzer, in the manner of a domain-specific language (DSL) analyzer or macro-analyzer. (3) A semantic analysis algorithm translating the bound syntax tree into symbols representative of data flows, patterns, reactions, functional expressions, timers, and input/output parameterizations. (4) An expression translator which transforms expression trees into stacks suitable for more or less direct translation into microprocessor ALU instructions. (5) A matcher generator for translating the patterns and expressions of reactions into an intermediate collection of potentially suboptimal matchers. (6) And a matcher combining and optimizing algorithm for producing unified, minimal matchers from the intermediate collection of matchers.

The output of the phase-1 translation tool includes: (1) The logical identities of each of the streams involved in the translation, such that each may be a unique referent among the plurality of streams. (2) A description of the flow in the data in each stream, each being inward (toward the reactions; that is, a subscription to an external source), outward (away from the reactions; that is, a publication to an external destination), both inward and outward (a publication/subscription pair), or internal (used only as intermediate steps in other reactions and therefore not surfaced as publications or subscriptions). (3) A description of the type of data flowing in each stream, each time being described in finite terms such that data being injected into or extracted from a stream may be statically checked for type correctness. (4) A set of tables describing the states and transitions of the matchers. (5) A set of expression stacks describing the calculations which are to be performed during reactions. (6) A table mapping stream inputs to matcher inputs. (7) A table mapping timed events to matcher inputs. (8) A table mapping matcher outputs to action pairs, each pair consisting of a reference to an expression stack and a stream output, indicating that the output of the matcher is to be transformed by the given expression then pushed to the given stream.

The Vel interpreter and dataflow simulator use the output of phase-1 translation directly. The interpreter emulates a hardware platform in the execution of the code and the dataflow simulator emulates a streaming data environment, providing inputs to and collecting outputs from Vel streams. Let us call these two tasks instruction interpretation and dataflow emulation.

Instruction interpretation is a category of task well understood by computer programmers who specialize in writing compilers and interpreters. The task includes constructing an execution context in which the states of runtime variables may be stored, and then stepping through the instructions of the program one at a time, accessing data from the execution context and updating it as needed.

In the case of Vel, the execution context must also include a set of queues to hold streams of data in the process of transformation and a table-driven state machine engine to execute the transformations described by the matchers. The queues arise due to declarations in the Vel source which describe flowing channels of data. Some of these are external inputs or outputs of the Vel program while others are purely internal channels describing intermediate states between input and output.

Dataflow emulation consists of providing access to external sources and sinks for data, such as files or sockets, and the programming necessary to exchange data between these external systems and the Vel program under interpretation. This will include injector functions, which read data from external sources and push them to the queues representing the program's inputs, and extractor functions, which pop data from the queues representing the programs outputs and write them to the external sinks.

Where Vel interpretation according to the invention differs from the norm is in the way the matchers become involved. The matcher driving engine reads data from the queues and uses them to advance the states of the matchers. The matcher tables include a column of side-effects which are executed when the matchers move through their states. These side-effects invoke instruction interpretation to perform computation, the results of which are pushed to other queues and this trigger other matchers.

In this way, a Vel program under interpretation according to the invention is firstly represented by a set of state machines—which are fast and small—and only drop back to general instruction interpretation when necessary. This allows the program to execute with greater efficiency than if it were all to be handled by instruction interpretation alone.

The Vel phase-2 translation tool is, for the most part, not specific to the Vel language but rather to the platform being targeted for execution. The Vel-language-related components of the phase-2 translator are: (1) Initial intake of the intermediate representation produced by phase-1. (2) Overall organization of the phase-2 code generation to produce a reactive system. (3) Provision of a library of runtime support components, such as those that perform external encoding and decoding of data formats or the internal regulation of real-time clocks.

A distinguishing feature of the Vel phase-2 translator is its implementation of the reactive system as a tristate flowgraph. A tool for creating programs for real-time processing of data streams in a multi-source, multi-destination data flow environment, includes: (1) Identifying a plurality of potential data streams. (2) Identifying a set of reactive functions and parameters corresponding to patterns of data in the streams. (3) Identifying a set of handling functions and parameters for transforming data matching declared patterns. (4) Identifying a set of timed events against which patterns of data flow are compared, such as intervals of time in which data are to be collected or discarded or specific points in time before or after which data are to be collected or discarded. (5) Creating a dataflow program describing the identified streams, reactions, functions, and timed events. (6) Providing the program as input to a two-phase translation tool comprising a phase-1 translation tool incorporating a matcher generator for translating Vel program statements to corresponding matchers and a phase-2 translation tool for generating platform-specific hardware instructions corresponding to the translated Vel statements for execution on the platform. (7) Receiving the output of each phase of the translation tool.

The output of the phase-1 translation tool may be used by the interpreter component, includes: (1) An instruction interpreter which emulates a hardware platform in the execution of the code. (2) A data flow simulator which emulates a streaming data environment, providing inputs to and collecting outputs from Vel streams.

The output of the phase-1 translation tool may be used as the input to the phase-2 translation tool, includes: (1) A hardware instruction generator which translates instructions from the intermediate representation to a form suitable for execution by the target hardware platform. (2) A program organization module, which directs the generation of the output into a form suitable for use in a reactive program in a dataflow environment. (3) Libraries of runtime support components necessary for execution. In an implementation, the output of the phase-2 translation tool is an executable program suitable for use on the targeted hardware platform.

In an implementation, a development environment for a dataflow programming language allows specifying of at least one matcher state machine that can perform pattern matching in a received an input stream and generate output data. The development environment includes tools to perform at least one of the following: identifying potential data streams; identifying a set of reactive functions and parameters corresponding to patterns of data in the streams; identifying a set of handling functions and parameters for transforming data matching declared patterns; and identifying a set of timed events against which patterns of data flow are compared, such as intervals of time in which data are to be collected or discarded or specific points in time before or after which data are to be collected or discarded. In an implementation, the dataflow programming language is Vel from FogHorn.

Further, the tools can perform at least one of the following: creating a dataflow program from expressed intent which describes the identified streams, reactions, functions, and timed events; providing the program as input to a two-phase translation tool comprising a first-phase translation tool incorporating a matcher generator for translating program statements to corresponding matchers, data flow topologies, functions, and related symbolic components, and a second-phase translation tool for generating optimized platform-specific hardware instructions corresponding to the translated statements for execution on the platform; and receiving the output of each phase of the translation tool.

The development environment has a graphical user interface or GUI that allows a user to add one or more compute blocks, where each compute block implements a state machine. The graphical user interface allows the user to select an input block to connect to one or more added compute blocks. The graphical user interface allows the user to select an output from one or more added compute blocks to connect to an output block (e.g., extractor) or to other transducers (e.g., stream blocks or compute blocks).

The development environment includes an interpreter component that uses the output of the first-phase translation tool. There is an instruction interpreter that emulates a hardware platform in the execution of the code. There is a data flow simulator which emulates a streaming data environment, providing inputs to and collecting outputs from state machine streams. There is a program execution flow controller to examine computations and data in-flight and drive computations back and forth.

The development environment includes a live inspection component. An inspection method instruments and attaches to a live running program on particular hardware program, and provides insights into the shape of the dataflow graph. There is an inspection method, executing after attachment, which extracts the state of the dataflow computation of a running program and provides an extremely precise and direct insight into computation along with data in consideration.

The development environment includes a visualization and data-flow simulation graphical-based component. There is a graphical-based interface (or Web-based interface, or a combination) to allow a program to be authored or displayed or revised in a graphical fashion. This assists a user to gain a more intuitive mental-model for streaming data analysis and thorough understanding of the action of the program. There is a dataflow simulation to test-drive an authored graphical program by visually simulating the actual flow of data via animations and links. There simulation component has external control by injecting a notion of time allowing the fluidity to go back and forth in data-flow and computation.

The interpreter component uses the output of the first-phase translation tool. An instruction interpreter emulates a hardware platform in the execution of the code. A data flow simulator emulates a streaming data environment and providing inputs to and collects outputs from state machine streams. A program execution flow controller examines computations and data in-flight and drives computations back and forth.

The first-phase translation tool includes a simulated publisher-subscriber multiplexer (typically called a message broker) to facilitate the exchange of simulated messages from a plurality of publishers to a number of subscribers within a debugging environment.

The development environment includes a live inspection component. There is an inspection method that instruments and attaches to a live-running program on a particular hardware program, and provides insights into the shape of the dataflow graph. There is an inspection method, executing after attachment, which extracts the state of the dataflow computation of a running program. The inspection method also provides an extremely precise and direct insight into computation along with data in consideration.

An output of the first-phase translation tool may be used as an input to the second-phase translation tool. The translation tool can include: A hardware instruction generator which translates instructions from the intermediate representation to a form suitable for execution by the target hardware platform. A program organization module, which directs the generation of the output into a form suitable for use in a reactive program in a dataflow environment. And libraries of runtime support components that allow execution on the target hardware platform. In an implementation, an output of the second-phase translation tool is an executable program suitable for use on the targeted hardware platform.

In an implementation, a system for dataflow programming development platform includes a graphical user interface that is displayed on a screen of a computer. Using a declarations screen of the graphical user interface of the development platform, the user can specify declarations data types including streams, constants, functions, and patterns. A pattern definition is used to specify a pattern to identify in a stream. Blocks representing the declarations data types are displayed on the screen so that the user can drag and drop the blocks into a desired position on the screen.

Using a reactions screen of the graphical user interface of the development platform, the user can interconnect the blocks of the declarations data types into a graphical representation of a dataflow program. In the reactions screen, the user can specify and alter interconnects (visible as wires or lines) between the different blocks.

Using a compute block screen of the graphical user interface of the development platform, the user can view and specify an operation performed by a compute block. The user can specify inputs to the compute block and computations on the inputs, and an output of the computer block. Using a code view screen of the graphical user interface of the development platform, the user can view and edit a computer code representation of the operation graphically represented in the compute block screen. The computer code is automatically generated by the development platform.

Using a compile command (e.g., graphical button) for the development platform interface, the user can direct the development platform interface to compile a dataflow program package representation of the dataflow program the user has specified using the development platform interface.

A stream type block can be used as a producer of data and also as transducer, taking input data and outputting data.

Further components of the development platform include: An instruction interpreter emulates a hardware platform in the execution of the code. A dataflow simulator interface emulates a streaming data environment, providing inputs to and collecting outputs from state machine streams. A program execution flow controller examines computations and data in-flight and drive computations back and forth. A simulated publisher-subscriber multiplexer facilitates the exchange of simulated messages from a plurality of publishers to a plurality of subscribers within a debugging environment.

In an implementation, a method of developing a dataflow program includes: Using a graphical user interface to specify a graphical representation of a dataflow program, the program comprising producer types, transducer types, and extractor types. Through the graphical user interface, the user can select and move the producer types, transducer types, and extractor types, represented using blocks, into various positions on a computer screen. Using the graphical user interface, allowing the user to interconnect via interconnection links the blocks representing the producer types, transducer types, and extractor types. Allowing the user to specify the details of each of the blocks through the graphical user interface, where for a transducer type block, the user can specify an operation. Automatically generating computer source code that corresponds to the dataflow program the user specified using the graphical user interface. Allowing the user to view and edit the computer source code automatically generated in a textual interface. Allowing the user to specify generating of a computer package of code executable on a target hardware platform that is an implementation of the dataflow program specified by the user using the graphical user interface.

The operation in a transducer block is a pattern matching operation. The automatically generating computer source code implements the operation using a state machine reflecting a technique that processes data of an input stream of a producer without backtracking. In another implementation, the automatically generating computer source code implements the operation using a state machine reflecting a technique that processes stream data from an input of a producer only once, and does not retain data previously read in a buffer to read again later. A producer can be a virtual representation of a hardware sensor.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method comprising:
    using a graphical user interface to specify a graphical representation of a dataflow program, the program comprising a plurality of types of blocks, wherein through the graphical user interface, a user can select and place the blocks into selected positions on a computer screen;
    using the graphical user interface, allowing the user to interconnect, via interconnection links, the blocks;

allowing the user to specify details of each of the blocks through the graphical user interface, wherein for a first type of block, the user can specify an operation, and the operation in the first type of block is a pattern matching operation;

allowing the user to specify generating of a computer package of code executable on a target hardware platform that is an implementation of the dataflow program specified by the user using the graphical user interface; and automatically generating computer source code that corresponds to the dataflow program the user specified using the graphical user interface, wherein the automatically generating computer source code comprises implementing the pattern matching operation using a state machine reflecting a technique that processes data of an input stream of a producer without backtracking.

2. The method of claim 1 comprising:
providing the user with performance semantic-level debugging capabilities.

3. The method of claim 1 comprising:
allowing the user to edit the computer source code automatically generated in a textual interface.

4. A method comprising:
providing a development environment for a dataflow programming language allowing specifying of at least one state machine that can perform pattern matching in a received input stream and generate output data, wherein the development environment comprises a plurality of tools to perform at least one of the following:

identifying a plurality of potential data streams;
identifying a set of reactive functions and parameters corresponding to patterns of data in the streams;
identifying a set of handling functions and parameters for transforming data matching declared patterns; or
identifying a set of timed events against which patterns of data flow are compared;
creating a dataflow program based on at least one of the identifying a plurality of potential data streams, identifying a set of reactive functions and parameters corresponding to patterns of data in the streams, identifying a set of handling functions and parameters for transforming data matching declared patterns, or identifying a set of timed events against which patterns of data flow are compared;
providing the dataflow program as input to a two-phase translation tool comprising a first-phase translation tool incorporating a matcher generator for translating program statements, and a second-phase translation tool for generating optimized platform-specific hardware instructions corresponding to the translated statements for execution on a hardware platform; and
receiving the output of each phase of the translation tool.

5. The method of claim 4 wherein a graphical user interface allows the user to select an input block to connect to one or more added compute blocks.

6. The method of claim 5 wherein the graphical user interface allows the user to select an output from one or more added compute blocks to connect to an output block.

7. The method of claim 4 wherein the timed events comprise at least one of an interval of time in which data is to be collected or discarded or a specific point in time before or after which data is to be collected or discarded.

8. The method of claim 4 wherein the development environment comprises a graphical user interface allowing a user to add one or more compute blocks, and each compute block comprises a state machine.

9. The method of claim 7 wherein the development environment comprises a graphical user interface allowing a user to add one or more compute blocks, and each compute block comprises a state machine.

10. The method of claim 5 wherein each compute block comprises a state machine.

11. The method of claim 4 wherein the development environment comprises an interpreter component that uses the output of the first-phase translation tool comprising:
an instruction interpreter which emulates the hardware platform in the execution of platform-translated specific hardware instructions;
a data flow simulator which emulates a streaming data environment, providing inputs to and collecting outputs from state machine streams; and
a program execution flow controller to examine computations and data in-flight and drive computations back and forth.

12. The method of claim 4 wherein the development environment comprises an inspection component comprising:
an inspection method that instruments and attaches to a live running program on a particular hardware program, providing insights into a shape of a data graph; and
an inspection method, executing after attachment, then extracts the state of the dataflow computation of a running program which provides an extremely precise and direct insight into computation along with data in consideration.

13. The method of claim 4 wherein the development environment comprises a visualization and dataflow simulation graphical-based component comprising:
a graphical-based interface to allow a program to be authored or displayed or revised in a graphical fashion, thereby assisting a user to gain a more intuitive mental-model for streaming data analysis and thorough understanding of the action of the program; and
a data flow simulation to test-drive an authored graphical program by visually simulating the actual flow of data via animations and links, with external control by injecting a notion of time allowing the fluidity to go back and forth in data-flow computation.

14. The method of claim 13 wherein the first-phase translation tool comprises a simulated publisher-subscriber multiplexer, commonly called a message broker, to facilitate the exchange of simulated messages from a plurality of publishers to a plurality of subscribers within a debugging environment.

15. The method of claim 13 wherein the development environment comprises an interpreter component that uses the output of the first-phase translation tool comprising:
an instruction interpreter which emulates the hardware platform in the execution of platform-translated specific hardware instructions;
a data flow simulator which emulates a streaming data environment, providing inputs to and collecting outputs from state machine streams; and
a program execution flow controller to examine computations and data in-flight and drive computations back and forth.

16. The method of claim 15 wherein the first-phase translation tool comprises a simulated publisher-subscriber multiplexer, commonly called a message broker, to facilitate the exchange of simulated messages from a plurality of publishers to a plurality of subscribers within a debugging environment.

17. The method of claim 15 wherein the development environment comprises an inspection component comprising:
   an inspection method that instruments and attaches to a live running program on a particular hardware program, providing insights into a shape of a data graph; and
   an inspection method, executing after attachment, then extracts the state of the dataflow computation of a running program which provides an extremely precise and direct insight into computation along with data in consideration.

18. The method of claim 4 wherein the output of the first-phase translation tool may be used as an input to the second-phase translation tool, and the translation tool comprises:
   a hardware instruction generator which translates instructions from an intermediate representation to a form suitable for execution by the target hardware platform;
   a program organization module, which directs the generation of the output into a form suitable for use in a reactive program in a dataflow environment; and
   libraries of runtime support components that allow execution on the target hardware platform.

19. The method of claim 18 wherein an output of the second-phase translation tool is an executable program suitable for use on the targeted hardware platform.

20. The method of claim 4 wherein the development environment can automatically generate computer source code to implement a pattern matching operation using the at least one state machine reflecting a technique that processes the received input stream without backtracking.

* * * * *